United States Patent
Kesavareddigari et al.

(10) Patent No.: US 11,678,209 B2
(45) Date of Patent: Jun. 13, 2023

(54) BEAM BLOCKAGE PREDICTION FOR VEHICLE COMMUNICATIONS

(71) Applicant: QUALCOMM Incorporated, San Diego, CA (US)

(72) Inventors: Himaja Kesavareddigari, Bridgewater, NJ (US); Chang-Sik Choi, Seoul (KR); Kapil Gulati, Belle Mead, NJ (US); Anantharaman Balasubramanian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 147 days.

(21) Appl. No.: 17/249,500

(22) Filed: Mar. 3, 2021

(65) Prior Publication Data

US 2022/0286875 A1 Sep. 8, 2022

(51) Int. Cl.
*H04W 24/04* (2009.01)
*H04W 4/40* (2018.01)
*H04B 7/0408* (2017.01)
*H04B 7/06* (2006.01)
*H04W 16/28* (2009.01)

(52) U.S. Cl.
CPC .......... *H04W 24/04* (2013.01); *H04B 7/0408* (2013.01); *H04B 7/0617* (2013.01); *H04W 4/40* (2018.02); *H04W 16/28* (2013.01)

(58) Field of Classification Search
CPC ....... H04W 24/04; H04W 4/40; H04W 16/28; H04B 7/0408; H04B 7/0617; H04B 7/0695; G01S 7/003
See application file for complete search history.

(56) References Cited

U.S. PATENT DOCUMENTS

| | | | |
|---|---|---|---|
| 2015/0382268 A1* | 12/2015 | Hampel | H04W 36/24 455/436 |
| 2018/0095466 A1* | 4/2018 | Allan | G05D 1/0246 |
| 2019/0123797 A1* | 4/2019 | Armand | H04B 7/0617 |

(Continued)

FOREIGN PATENT DOCUMENTS

| | | | |
|---|---|---|---|
| WO | WO-2022083860 A1 * | 4/2022 | |
| WO | WO-2022087190 A1 * | 4/2022 | |

OTHER PUBLICATIONS

Yang et al., Blockage Effect and Beam Cooperation in Indoor Hotspot based on 3GPP NR Blockage Model, May 2019. (Year: 2019).*

(Continued)

*Primary Examiner* — Tejis Daya
(74) *Attorney, Agent, or Firm* — Harrity & Harrity, LLP

(57) ABSTRACT

Various aspects of the present disclosure generally relate to wireless communication. In some aspects, a first wireless communication device may determine that a second wireless communication device is to communicate with a third wireless communication device using one or more beams that pass through a target area. The first wireless communication device may obtain information indicating a first object that is approaching the target area and that has a beam blocking size above a threshold. The first wireless communication device may cause the one or more of the second wireless communication device or third wireless communication device to adjust usage of the one or more beams during an expected blockage time in the target area. Numerous other aspects are described.

30 Claims, 20 Drawing Sheets

(56) References Cited

U.S. PATENT DOCUMENTS

2019/0238658 A1* 8/2019 Shimizu .................. H04W 4/46
2020/0275402 A1* 8/2020 Shi ......................... H04W 16/28
2021/0051495 A1* 2/2021 Gupta ............... H04W 72/1231

OTHER PUBLICATIONS

Choi J., et al., "Millimeter-Wave Vehicular Communication to Support Massive Automotive Sensing", IEEE Communications Magazine, IEEE Service Center, Piscataway, US, vol. 54, No. 12, Dec. 1, 2016, XP011637192, XP055554183, ISSN: 0163-6804, DOI: 10.1109/MCOM.2016.1600071CM [retrieved on Dec. 15, 2016], pp. 160-167.
International Search Report and Written Opinion—PCT/US2022/070355—ISA/EPO—dated May 27, 2022.

* cited by examiner

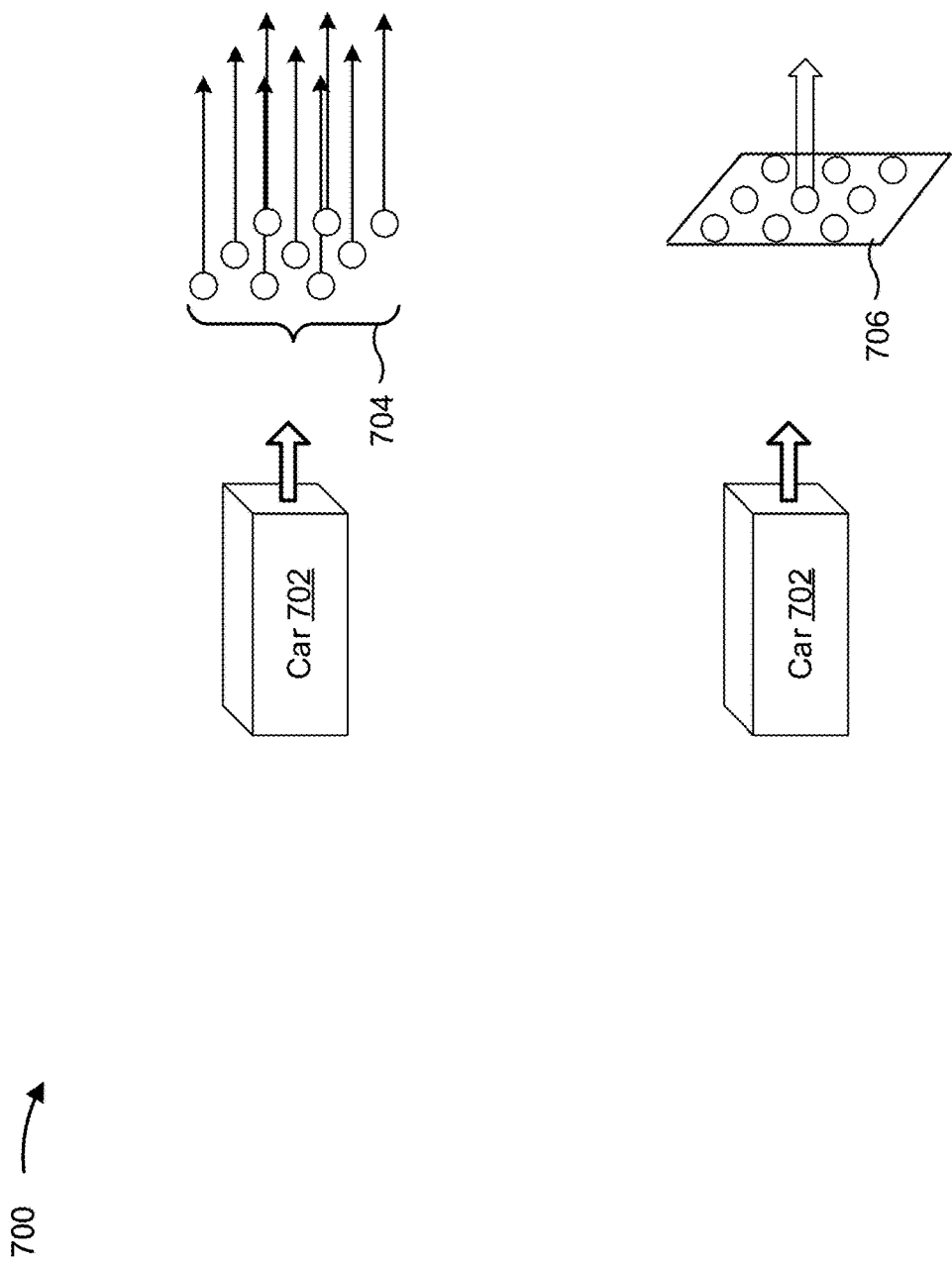

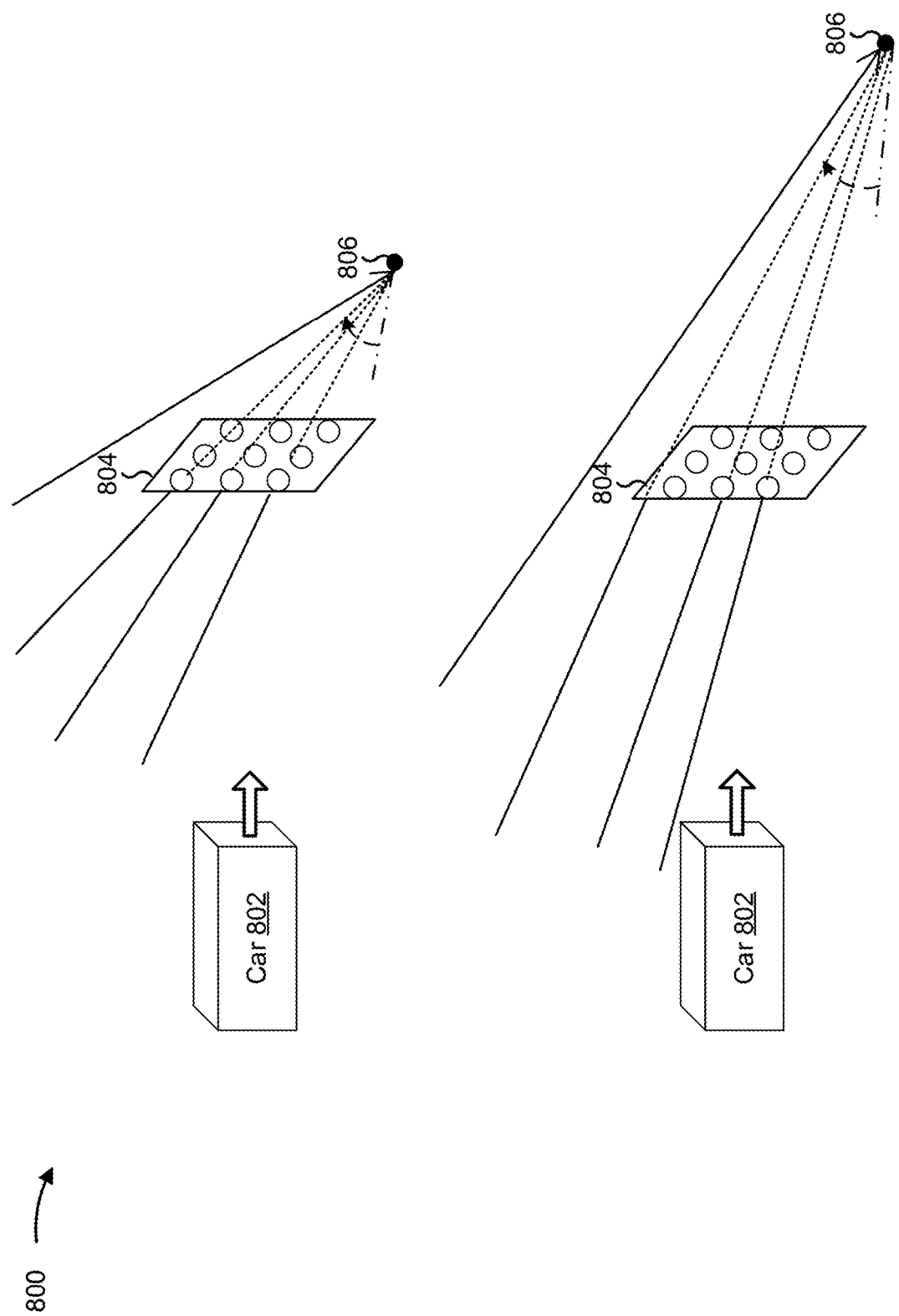

BEAM BLOCKAGE PREDICTION FOR VEHICLE COMMUNICATIONS

FIELD OF THE DISCLOSURE

Aspects of the present disclosure generally relate to wireless communication and to techniques and apparatuses for predicting beam blockage for vehicle communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device includes determining, by the first wireless communication device, that a second wireless communication device is to communicate with a third wireless communication device using one or more beams that pass through a target area. The method includes obtaining, by the first wireless communication device from one or more vehicle mobile stations, information indicating a first object that is approaching the target area and that has a beam blocking size above a threshold. The method also includes causing, by the first wireless communication device, the one or more of the second wireless communication device or third wireless communication device to adjust usage of the one or more beams during an expected blockage time in the target area.

In some aspects, a method of wireless communication performed by a base station includes determining, by the base station, that a first wireless communication device is to communicate with a second wireless communication device using one or more beams that pass through a target area. The method includes transmitting, by the base station to a third wireless communication device, an indication to identify an object that is approaching the target area and that has a beam blocking size above a threshold, and receiving, by the base station from the third wireless communication device, an indication that a first object is approaching the target area and has a beam blocking size above the threshold. The method also includes causing, by the base station, the first wireless communication device is to adjust usage of the one or more beams during an expected blockage time in the target area.

In some aspects, a first wireless communication device for wireless communication includes a memory and one or more processors operatively coupled to the memory, the memory and the one or more processors configured to determine that a second wireless communication device is to communicate with a third wireless communication device using one or more beams that pass through a target area, and obtain information indicating a first object that is approaching the target area and that has a beam blocking size above a threshold. The one or more processors are configured to cause the one or more of the second wireless communication device or third wireless communication device to adjust usage of the one or more beams during an expected blockage time in the target area.

In some aspects, a base station for wireless communication includes a memory and one or more processors operatively coupled to the memory, the memory and the one or more processors configured to determine that a first wireless communication device is to communicate with a second wireless communication device using one or more beams that pass through a target area, transmit an indication to identify an object that is approaching the target area and that has a beam blocking size above a threshold, and receive an indication that a first object is approaching the target area and has a beam blocking size above the threshold. The one or more processors are configured to cause the first wireless communication device is to adjust usage of the one or more beams during an expected blockage time in the target area.

In some aspects, a non-transitory computer-readable medium storing a set of instructions for wireless communication includes one or more instructions that, when executed by one or more processors of a first wireless communication device, cause the first wireless communication device to determine that a second wireless communication device is to communicate with a third wireless communication device using one or more beams that pass through a target area, obtain information indicating a first object that is approaching the target area and that has a beam blocking size above a threshold, and cause the one or more of the second wireless communication device or third wireless communication device to adjust usage of the one or more beams during an expected blockage time in the target area.

In some aspects, a non-transitory computer-readable medium storing a set of instructions for wireless communication includes one or more instructions that, when executed by one or more processors of a base station, cause the base station to determine that a first wireless communication device is to communicate with a second wireless communication device using one or more beams that pass through a target area, transmit an indication to identify an object that is approaching the target area and that has a beam blocking size above a threshold, receive an indication that a first object is approaching the target area and has a beam blocking size above the threshold, and cause the first wireless communication device is to adjust usage of the one or more beams during an expected blockage time in the target area.

In some aspects, an apparatus for wireless communication includes means for determining that a first wireless communication device is to communicate with a second wireless communication device using one or more beams that pass through a target area, means for obtaining information indicating a first object that is approaching the target area and that has a beam blocking size above a threshold, and means for causing the one or more of the first wireless communication device or second wireless communication device to adjust usage of the one or more beams during an expected blockage time in the target area.

In some aspects, an apparatus for wireless communication includes means for determining that a first wireless communication device is to communicate with a second wireless communication device using one or more beams that pass through a target area, means for transmitting an indication to identify an object that is approaching the target area and that has a beam blocking size above a threshold, means for receiving an indication that a first object is approaching the target area and has a beam blocking size above the threshold, and means for causing the first wireless communication device to adjust usage of the one or more beams during an expected blockage time in the target area.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of predicting beam blockage, in accordance with the present disclosure.

FIG. 8 is a diagram illustrating an example of predicting beam blockage, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
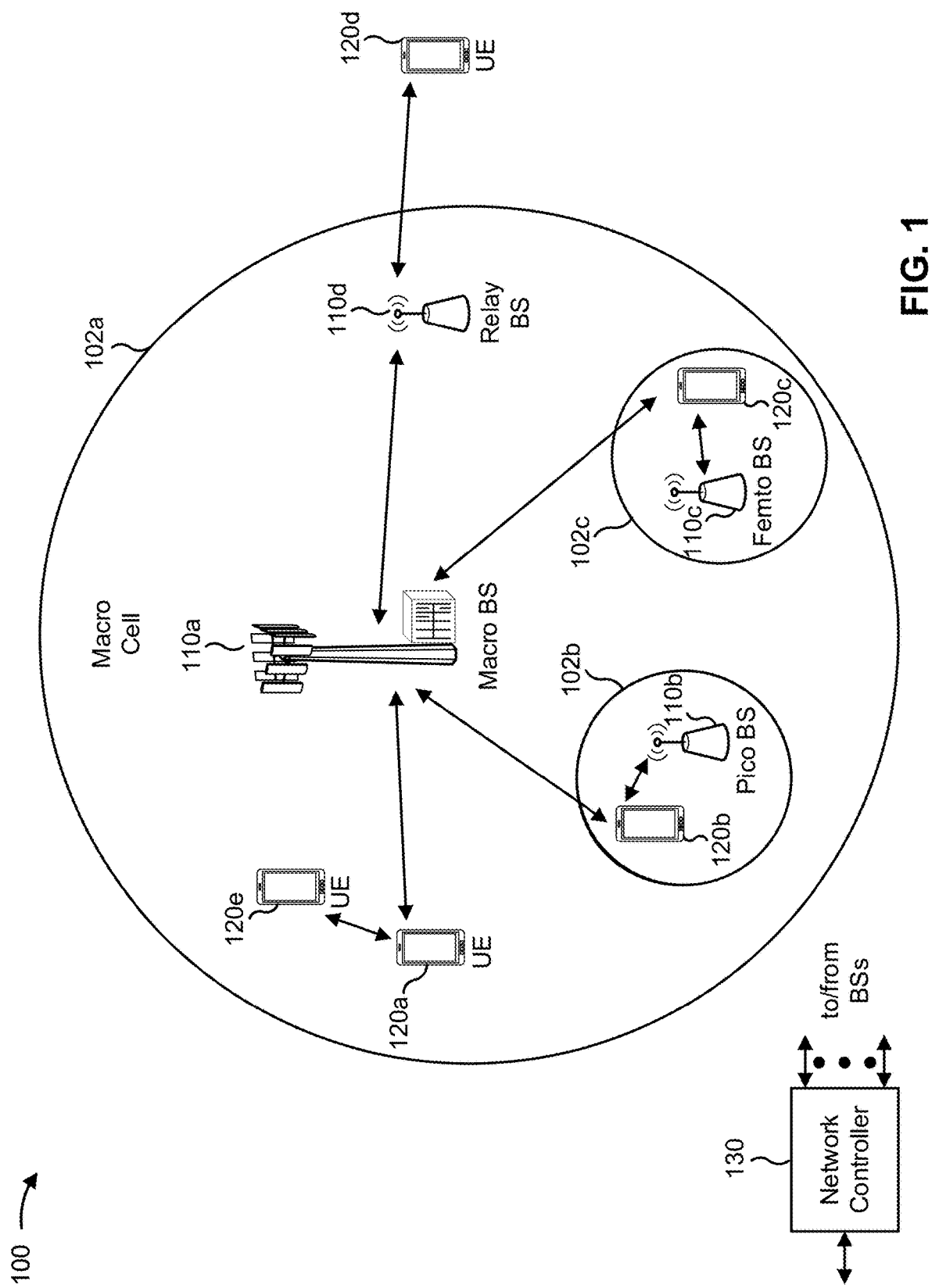
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, vehicle-to-pedestrian (V2P), or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
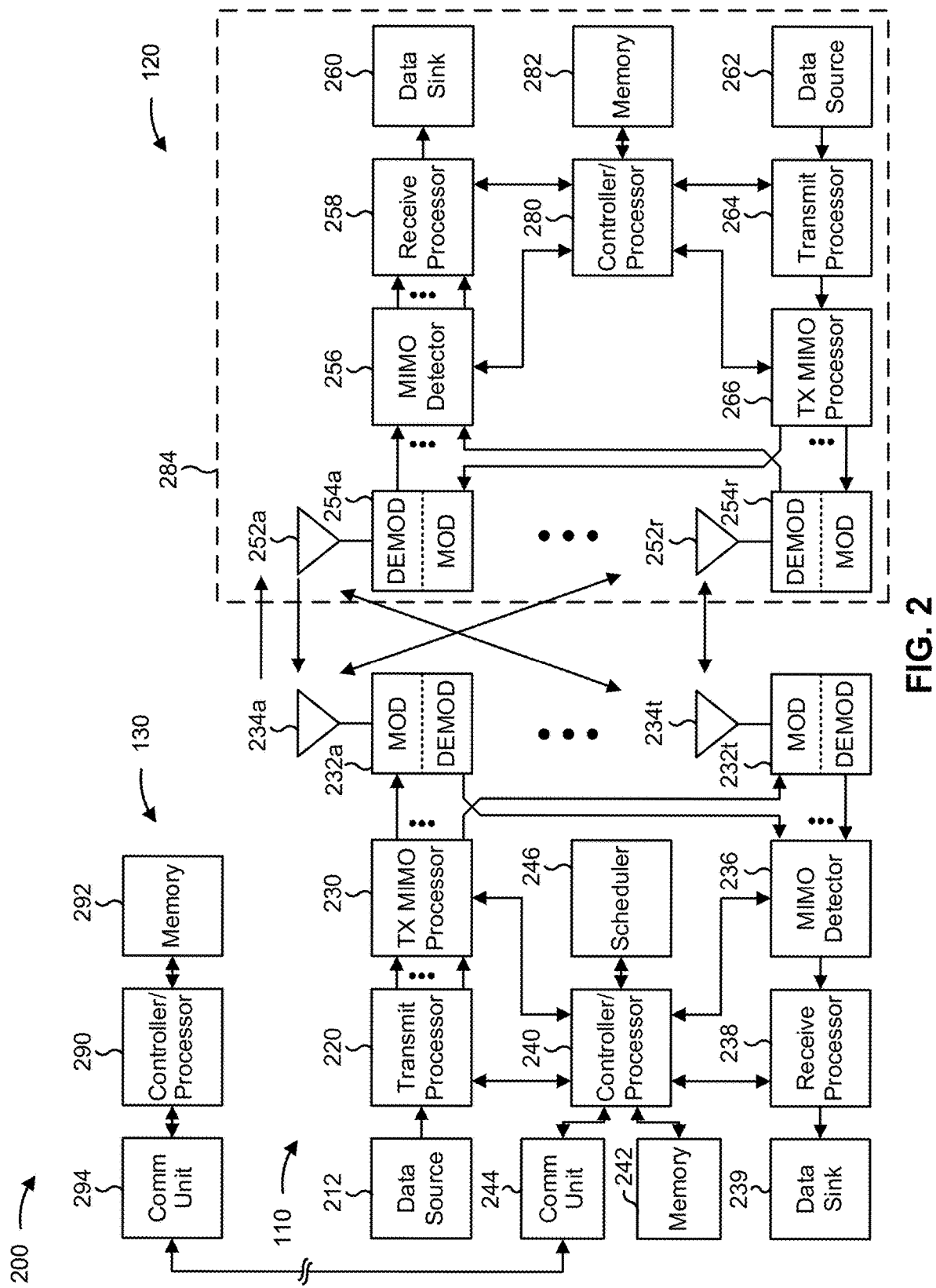
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-17).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-17).

Controller/processor 240 of base station 110, controller/processor 280 of UE 120, and/or any other component(s) of FIG. 2 may perform one or more techniques associated with predicting beam blockage for vehicle communications, as described in more detail elsewhere herein. In some aspects, the mobile station described herein is UE 120, is included in UE 120, or includes one or more components of UE 120 shown in FIG. 2. In some aspects, the wireless communication devices described herein may be UE 120, may be included in UE 120, may include one or more components of UE 120 shown in FIG. 2, may be base station 110, may be included in base station 110, or may include one or more components of base station 110 shown in FIG. 2. For example, controller/processor 240 of base station 110, controller/processor 280 of UE 120, and/or any other component(s) of FIG. 2 may perform or direct operations of, for example, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, a first wireless communication device includes means for determining, by the first wireless communication device, that a second wireless communication device is to communicate with a third wireless communication device using one or more beams that pass through a target area; means for obtaining, by the first wireless communication device from one or more vehicle mobile stations, information indicating a first object that is approaching the target area and that has a beam blocking size above a threshold; and/or means for causing, by the first wireless communication device, the one or more of the second wireless communication device or third wireless communication device to adjust usage of the one or more beams during an expected blockage time in the target area. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for broadcasting a vehicle-to-everything message, and/or means for receiving, from a first vehicle mobile station of the one or more vehicle mobile stations, first sensing information associated with the first object.

In some aspects, the first wireless communication device includes means for receiving, by the first wireless communication device from a second vehicle mobile station of the one or more vehicle mobile stations, second sensing information associated with the first object, and/or means for determining, by the first wireless communication device, one or more dimensions of the first object based at least in part on the first sensing information and the second sensing information.

In some aspects, the first wireless communication device includes means for associating, by the first wireless communication device with the first object, a representative point of one or more points of a surface of the first object, and/or means for tracking, by the first wireless communication device, the representative point to predict when the first object is to be in the target area.

In some aspects, the first wireless communication device includes means for associating, by the first wireless communication device, the first object with a second object traveling to the target area, and/or means for tracking, by the first wireless communication device, the first object and the second object as a group.

In some aspects, the first wireless communication device includes means for transmitting, by the first wireless communication device to one or more vehicle mobile stations, information indicating that the first object is approaching the target area and has a beam blocking size above the threshold.

In some aspects, the first wireless communication device includes means for transmitting, by the first wireless communication device, a request for one or more of location information or velocity information for the first object based at least in part on a lack of information for a dimension of the first object.

In some aspects, base station 110 includes means for determining, by the base station, that a first wireless communication device is to communicate with a second wireless communication device using one or more beams that pass through a target area; means for transmitting, by the base station to a third wireless communication device, an indication to identify an object that is approaching the target area and that has a beam blocking size above a threshold; means for receiving, by the base station from the third wireless communication device, an indication that a first object is approaching the target area and has a beam blocking size above the threshold; and/or means for causing, by the base station, the first wireless communication device is to adjust usage of the one or more beams during an expected blockage time in the target area. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, base station 110 includes means for receiving, by base station 110, an indication of one or more dimensions of the first object.

In some aspects, base station 110 includes means for transmitting, by base station 110 to one or more vehicle mobile stations, information indicating that the first object is approaching the target area and has a beam blocking size above a threshold.

As indicated above, FIG. 2 is provided as an example. Other examples may differ from what is described with regard to FIG. 2.

Figure 3:
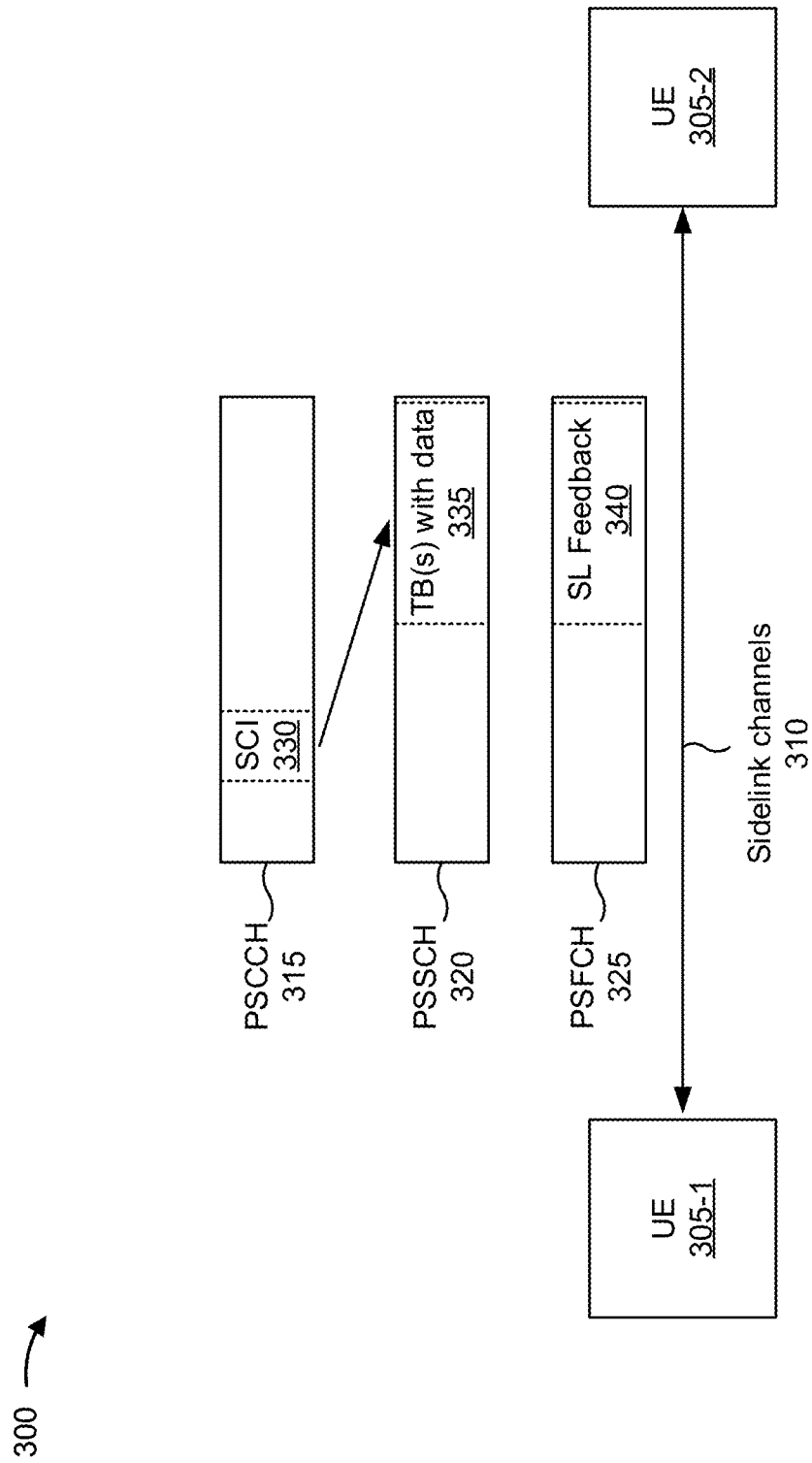
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. PSCCH 315 may be used to communicate control information, similar to a physical downlink control channel (PDCCH) and/or a physical uplink control channel (PUCCH) used for cellular communications with a base station 110 via an access link or an access channel PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on PSSCH 320. TB 335 may include data. PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by UE 305 (e.g., rather than a base station 110). In some aspects, UE 305 may perform resource selection and/or scheduling by sensing channel availability for transmissions. For example, UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, UE 305 may perform resource selection and/or scheduling using SCI 330 received in the PSCCH 315, which may indicate occupied resources and/or channel parameters. Additionally, or alternatively, UE 305 may perform resource selection and/or scheduling by determining a channel busy rate (CBR) associated with various sidelink channels, which may be used for rate control (e.g., by indicating a maximum number of resource blocks that UE 305 can use for a particular set of subframes).

In the transmission mode where resource selection and/or scheduling is performed by a UE 305, UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
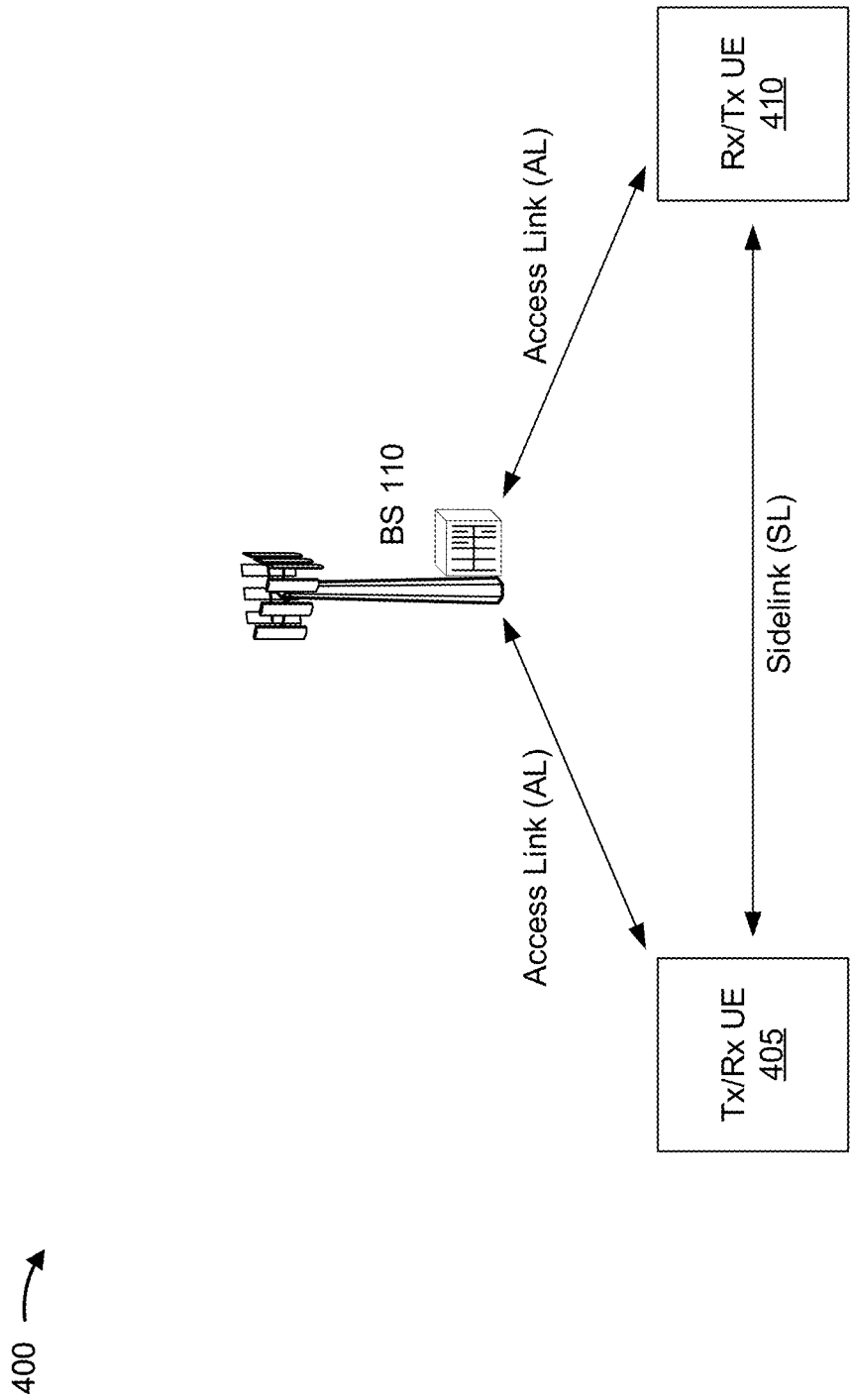
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with UE 405 via a first access link. Additionally, or alternatively, in some sidelink modes, base station 110 may communicate with UE 410 via a second access link. UE 405 and/or UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
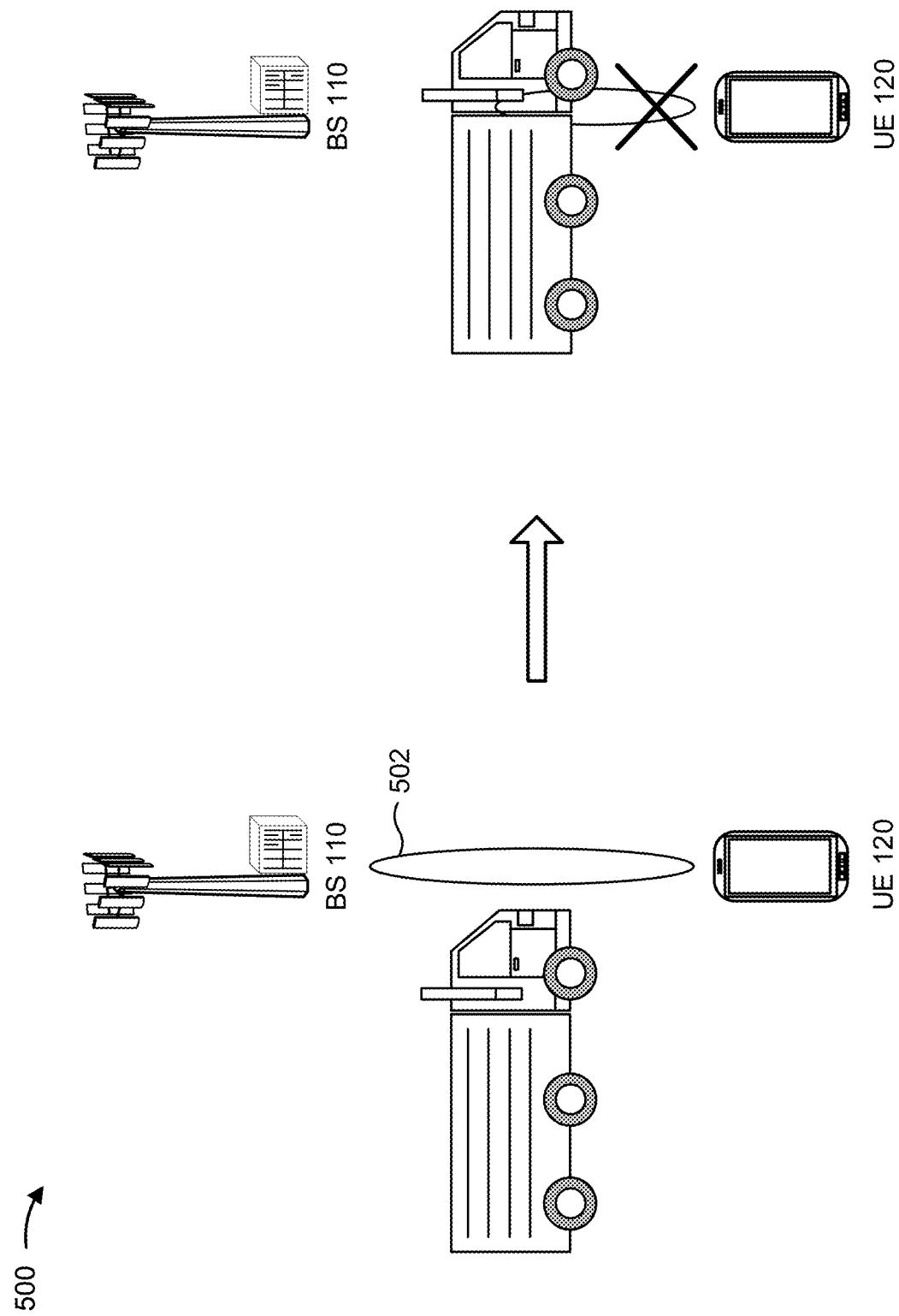
FIG. 5 is a diagram illustrating an example of beam blocking, in accordance with the present disclosure.

FIG. 5 is a diagram illustrating an example 500 of beam blocking, in accordance with the present disclosure.

As shown in FIG. 5, a base station 110 and a UE 120 may communicate with one another via one or more beams 502, which may include an uplink beam, a downlink beam, and/or a beam pair. As further shown, beam 502 may become blocked, such as when an obstruction interrupts a propagation path of beam 502. The obstruction may be a stationary object, such as a building or a parked car. The obstruction may also be a moving object, such as a vehicle. In example 500, a large truck is shown as blocking the path of beam 502 for a pedestrian UE that is near traffic.

Beam blocking may result in an abrupt decrease (e.g., below a threshold, such as a noise floor) in the useful signal strength received for beam 502 and/or one or more adjacent beams in a beam set that includes beam 502. Narrow beams of millimeter waves may be more susceptible to blocking. The degradation in signal strength may occur across the entire system bandwidth on those beams (e.g., rather than being isolated to one or more frequencies) for a duration of time. This may result in communication errors, such as dropped communications, failed reception, failed demodulation, and/or failed decoding. However, the received signal strength on other beams that are not blocked may be unaffected or may be above a threshold (e.g., the noise floor) such that beam switching to one of these beams provides a viable link between UE 120 and base station 110.

When beam blocking occurs, base station 110 may reconfigure UE 120 to switch to a different beam or beam direction and/or retransmit a communication once the blocking event has ended. Additionally, or alternatively, base station 110 may perform link adaptation for beam 502 if base station 110 determines that beam 502 is not blocked.

In dynamic environments, predicting a beam blockage may be important for seamless connectivity. Base station 110 may collect environmental terrain data and sensing data to predict a blockage of a path between base station 110 and UE 120. The sensing data may include measurements of RSRP at UE 120. Base station 110 may also use location updates for UE 120 or model a history of blockage events to predict a blockage. However, these are base station-centric solutions that may lack accurate and timely information. Without accurate and timely information, beam blockages may be underpredicted or overpredicted, which may cause a UE to waste power, processing resources, and signaling resources.

As indicated above, FIG. 5 is provided as an example. Other examples may differ from what is described with regard to FIG. 5.

FIGS. 6A-6D are diagrams illustrating an example 600 of predicting beam blockage, in accordance with the present disclosure. FIGS. 6A-6D show a BS 610 (e.g., a BS 110 depicted in FIGS. 1 and 2), a TRP 615 (e.g., BS 110 or a UE 120 depicted in FIGS. 1 and 2), and a pedestrian UE 620 (e.g., a UE 120) that may communicate with each other in a wireless network, such as wireless network 100. Example 600 also shows a blocking object 625, such as a large trailer truck, and multiple vehicle UEs, such as vehicle UE 630, vehicle UE 635, and vehicle 640. FIGS. 6A-6D may show events that take place in a time sequence.

According to various aspects described herein, a wireless communication device, such as a vehicle UE or a TRP (e.g., a roadside unit) of a V2I system, may obtain information from vehicle UEs to predict that another UE (e.g., a pedestrian UE) is to have a beam blocked by a large object (e.g., a tractor trailer, a service vehicle, a large van). The large object may be headed to a traffic area where the large object could block beamformed signals of the pedestrian UE. The wireless communication device may predict a time and place for the blockage and cause the pedestrian UE and/or a receiving device to adjust beam usage to account for the predicted blockage. The wireless communication device may integrate sensing data (e.g., location data of objects, velocity data of objects) from multiple connected vehicles to generate a complete picture of the environment. For example, the wireless communication device may obtain directions and velocities of vehicle UEs and a direction and velocity of the pedestrian UE to predict a near-future state of the environment. By obtaining information about the large object from vehicle UEs, the wireless communication device may predict and address the beam blockage in real time and with more accuracy. As a result, the pedestrian UE and the receiving device may not suffer degraded communications. Avoiding degraded communications conserves power, processing resources, and signaling resources.

Figure 6A:
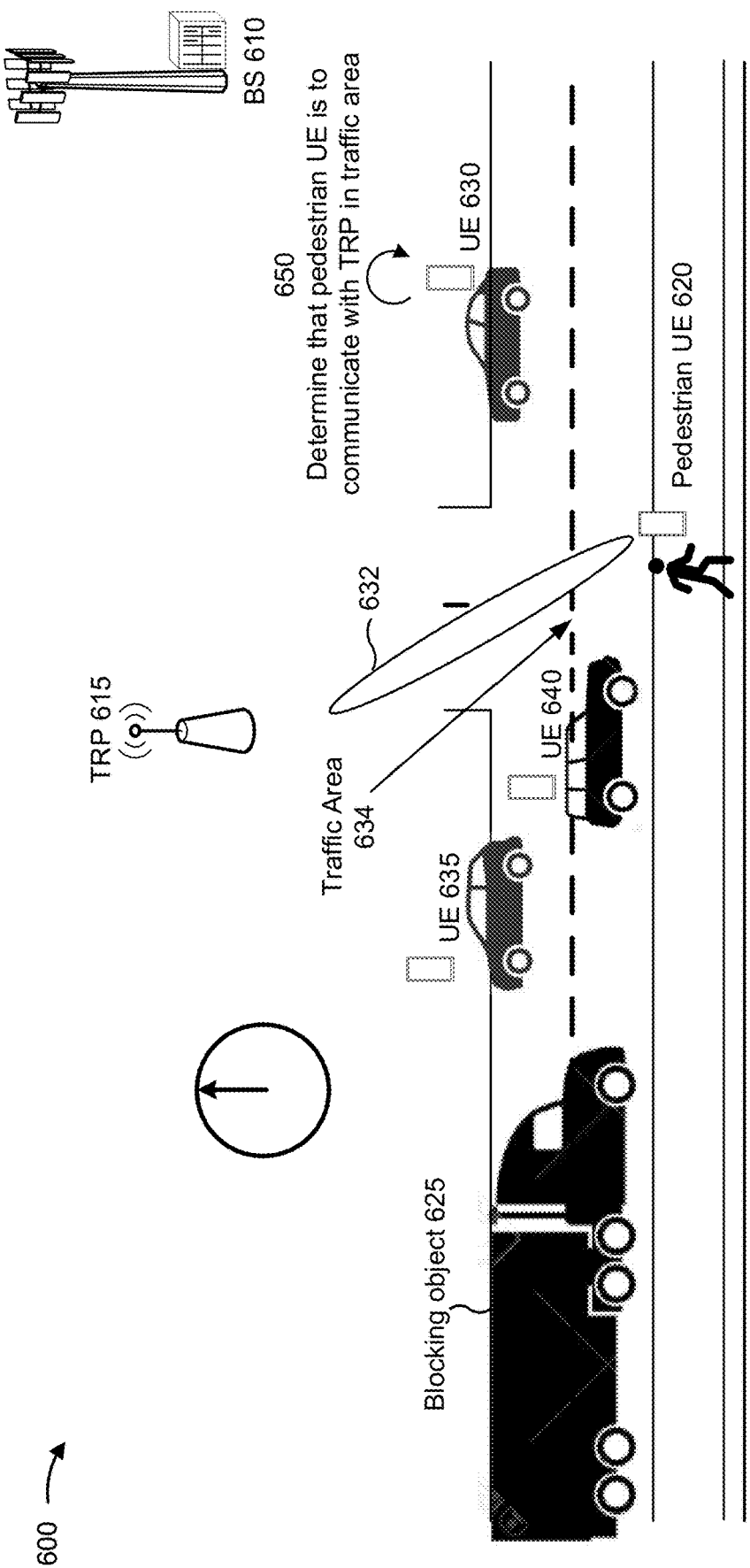
FIGS. 6A-6D are diagrams illustrating an example of predicting beam blockage, in accordance with the present disclosure.

In example 600, the wireless communication device may be vehicle UE 630 (e.g., UE-X). As shown by FIG. 6A and by reference number 650, vehicle UE 630 may determine that pedestrian UE 620 is to communicate with TRP 615 using beam 632 in traffic area 634 (e.g., intersection). Vehicle UE 630 may make this determination based at least in part on information received from BS 610, TRP 615, vehicle UE 635, or vehicle UE 640. Vehicle UE 630 may also make this determination based at least in part on detecting pedestrian UE 620, object tracking information, sensing data, and/or terrain data. Vehicle UE 630 may predict future locations of pedestrian UE 620 based at least in part on a velocity and direction of pedestrian UE 620.

Figure 6B:
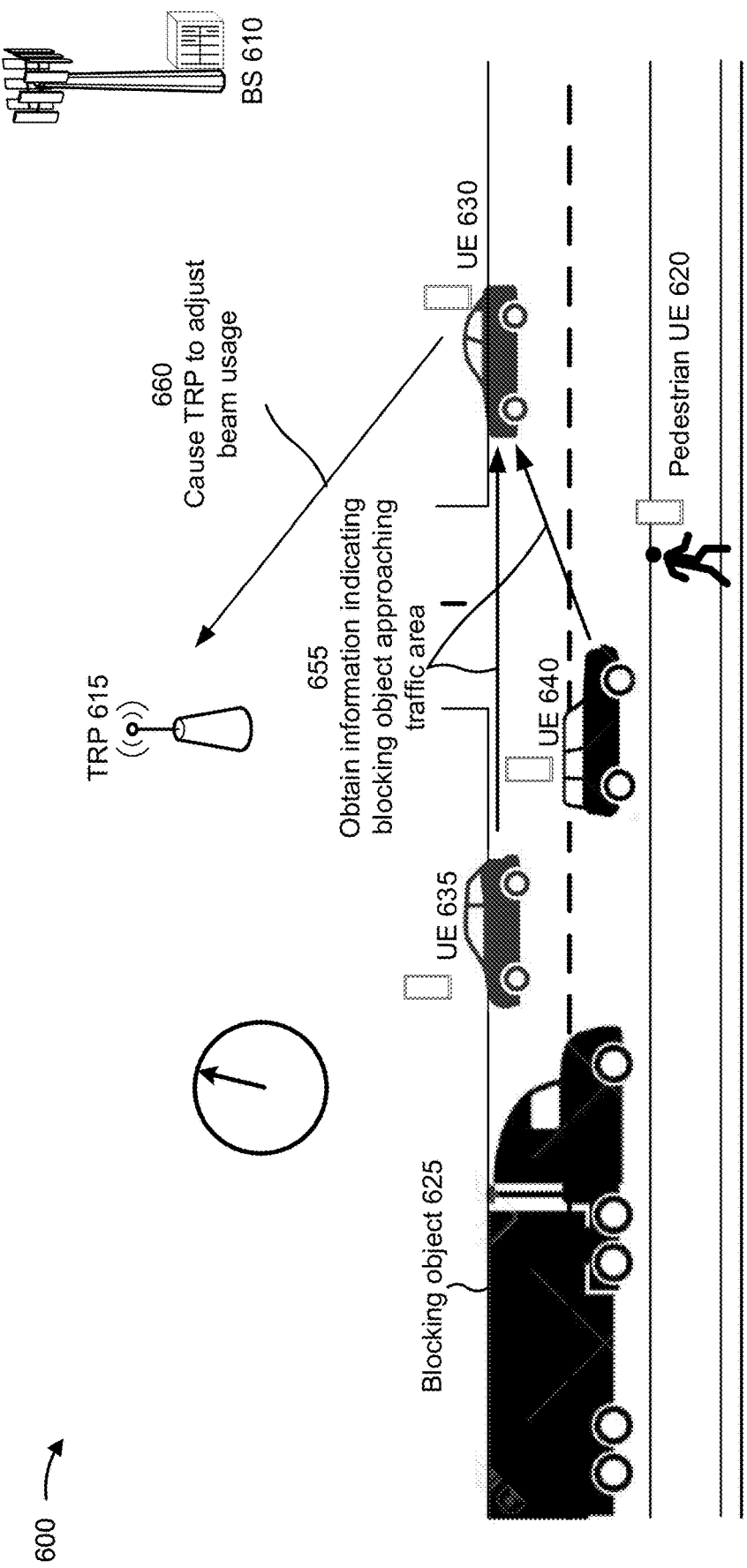

As shown by FIG. 6B and by reference number 655, vehicle UE 630 may obtain information indicating that blocking object 625 is approaching traffic area 634. Vehicle UE 630 may receive information about blocking object 625 from vehicle UE 635 and/or vehicle UE 640. The information may specify that blocking object 625 has a surface size that satisfies (e.g., meets or exceeds) a blocking size threshold and may indicate a velocity and direction of blocking object 625. The information may be provided in basic safety messages (BSMs), and/or the information may be provided in response to a request (e.g., broadcast V2X message) from vehicle UE 630.

In some aspects, vehicle UE 630 may determine that traffic area 634 may be a space where pedestrian UE 620 may not receive beams arriving at certain angles due to blocking object 625. For example, if traffic area 634 were defined, according to a local or global coordinate system, with a distance down the road (x-axis) between units 10 and 20, a distance of 5 units along a direction of the road (y-axis), and a height between 0 and 1 unit on the road (z-axis), beam 632 of pedestrian UE 620 in traffic area 634 may be blocked by the approach of an object with dimensions similar to those of blocking object 625 if beam 632 has, for example, an angle of arrival smaller than 30° from TRP 615 to the current location of the pedestrian UE 620. That is, in addition to the location of pedestrian UE 620, the dimensions of blocking object 625 may determine which angles of arrival are blocked. Vehicle UE 630 may determine that blocking object 625 may affect beams with this angle of arrival if blocking object 625 is in traffic area 634. The blockage may also affect the detection range of vehicle sensors that might contribute to blockage predictions.

Figure 6C:
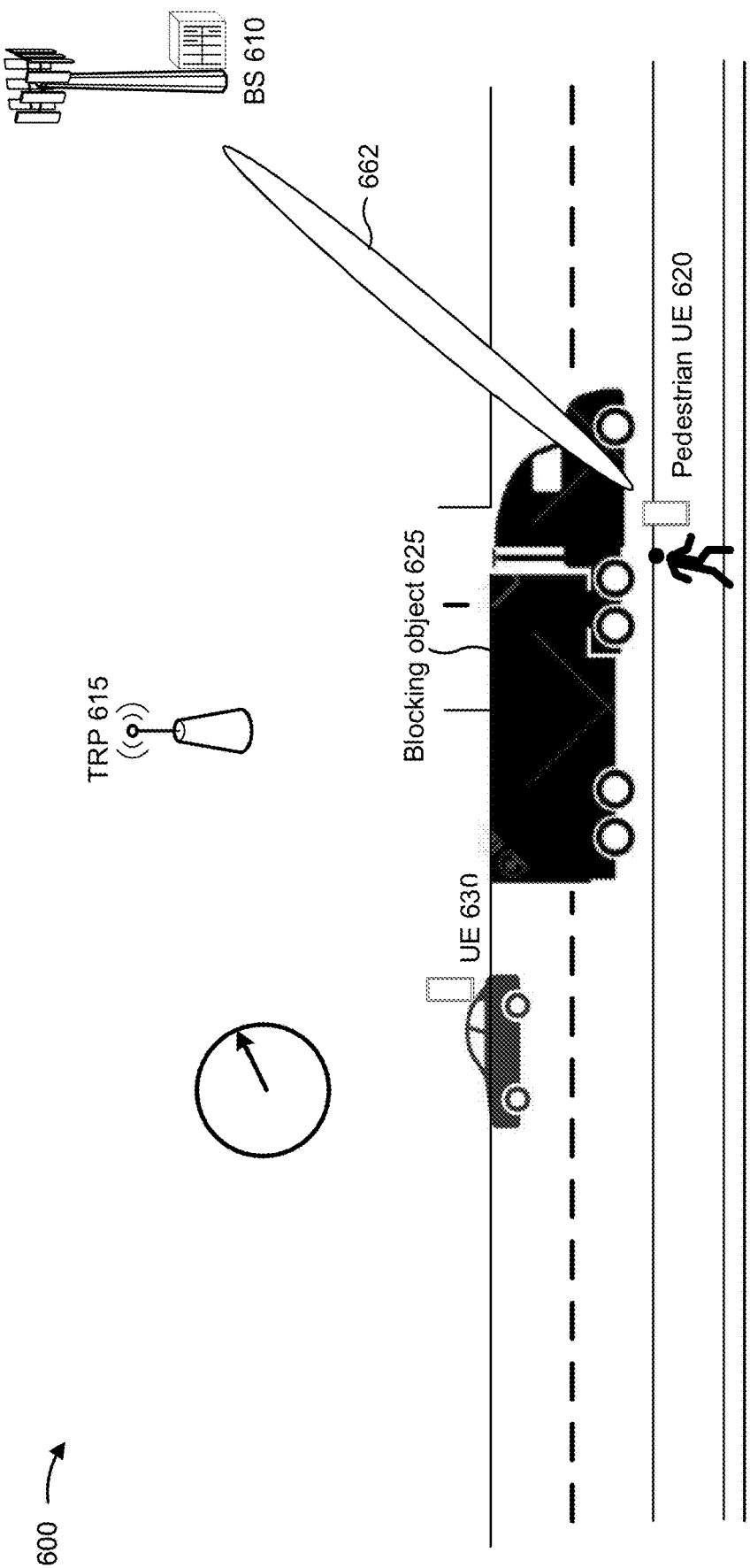
Figure 6D:
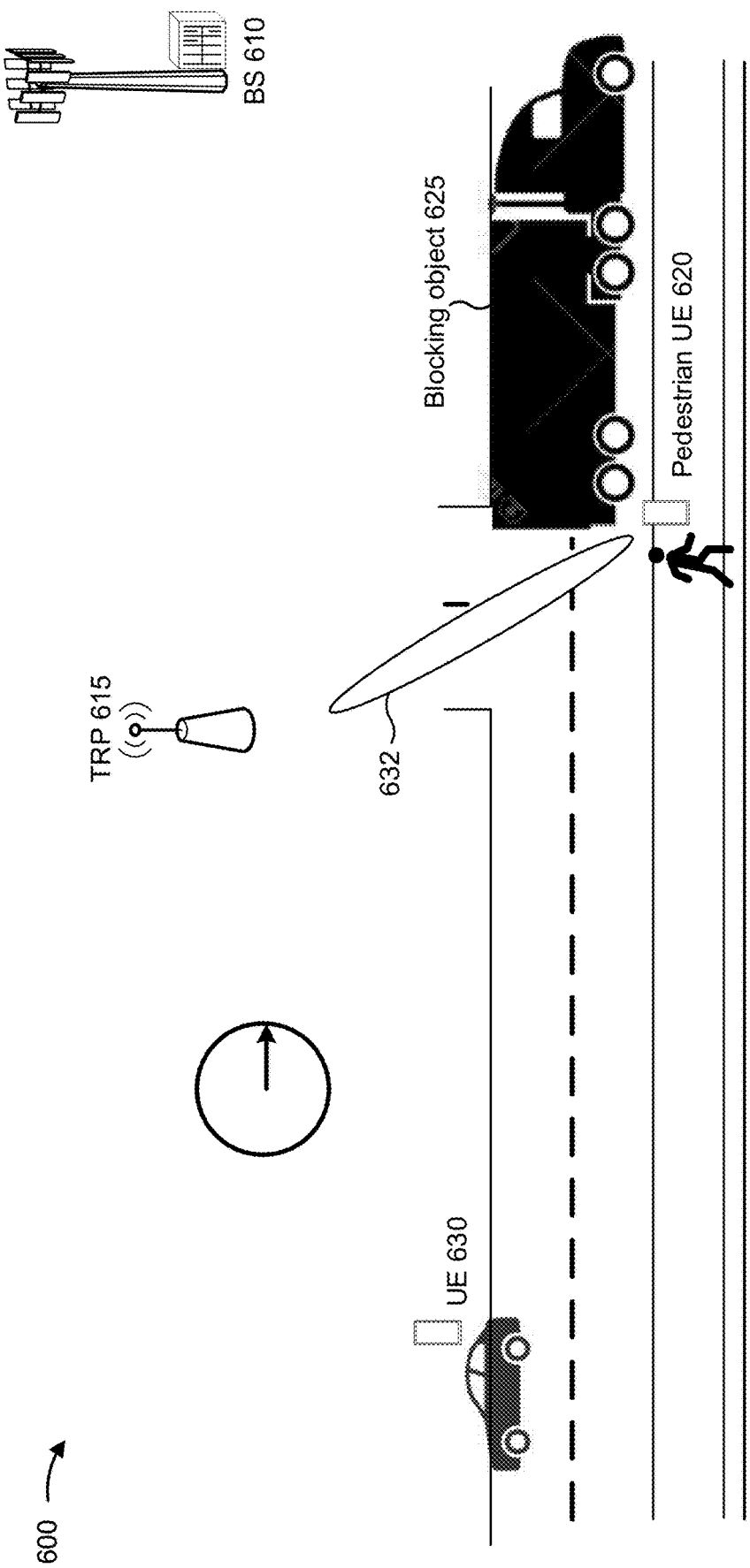

Vehicle UE 630 may transmit information to TRP 615 (or BS 610) indicating that a beam of pedestrian UE 620 is to be blocked by blocking object 625 in traffic area 634. TRP 615 or BS 610 may share this information with other vehicle UEs, pedestrian UEs, or other roadside units. As shown by reference number 660, vehicle UE 630 may cause TRP 615 (or BS 610) to adjust beam usage of pedestrian UE 620. This may involve TRP 615 or BS 610 configuring pedestrian UE 620 to switch beams for a duration of time that blocking object 625 is predicted to be in traffic area 634. For example, as shown by FIG. 6C, pedestrian UE 620 may use another beam 662 to transmit or receive communications via BS 610 while blocking object 625 is in traffic area 634. As shown by FIG. 6D, pedestrian UE 620 may be configured or scheduled to use beam 632 again after blocking object 625 has left traffic area 634 and is no longer blocking beam 632. In this way, communications involving pedestrian UE 620 are not interrupted or degraded by blocking object 625.

In some aspects, any stationary vehicle UE, roadside unit (RSU), or other connected entity in a region may be designated as the UE-X, or the wireless communication device that is predicting beam blockage. In FIGS. 6A-6D, the UE-X may be vehicle UE 630. The UE-X may identify a target area in its vicinity and initiate a distributed sensing process for identifying blocking objects and blocked subspaces by using a broadcast V2X message. Vehicle UEs that receive the UE-X's message may respond with an indication that they are capable of distributed sensing and can share their sensing data from a radar, a camera, a lidar, and/or an antenna. The UEs that receive the V2X message may then share the sensing data (e.g., a location and a velocity of points of an object, a surface of an object, one or more dimensions of an object), either periodically or when requested by the UE-X. The UE-X may receive information for a whole or partial detected surface of a stationary or moving object, a velocity, and a subspace blocked by the detected surface. The UE-X may compute, from the received information, a fully-identified stationary or moving object, a velocity, and a blocked subspace that the moving object blocks. The UE-X may cause beam usage to be adjusted for affected UEs.

As indicated above, FIGS. 6A-6D are provided as an example. Other examples may differ from what is described with regard to FIGS. 6A-6D.

FIG. 7 is a diagram illustrating an example 700 of predicting beam blockage, in accordance with the present disclosure.

Example 700 shows that a wireless communication device, such as a vehicle UE in car 702, that may observe locations of multiple points 704 of one or more moving objects on a road. The vehicle UE may detect that multiple points 704 move together at a same velocity, as in a cluster, and thus are part of a same surface 706. The vehicle UE may define boundaries for the cluster of points to derive a partial imprint of a blocking object or a neighboring vehicle's presence.

As indicated above, FIG. 7 is provided as an example. Other examples may differ from what is described with regard to FIG. 7.

FIG. 8 is a diagram illustrating an example 800 of predicting beam blockage, in accordance with the present disclosure.

Example 800 shows that a wireless communication device, such as a vehicle UE in car 802, may determine that a surface 804 of a blocking object, such as surface 706 depicted in FIG. 7, may block signals to and from a UE 806. The blockage by surface 804 may depend on an angle of a beam from UE 806 and/or a distance of UE 806 from surface 804. The vehicle UE may determine a blocked subspace of potential UE locations and a corresponding range of incoming beams blocked by surface 804, based at least in part on a size, a location, and/or orientation of surface 804 and a location of UE 806. For surface 804, the blocked subspace may defined as $\{x, y, z, \theta_{az}, \theta_{el}\}$ such that $\{(x, y, z) \in \mathcal{L}_A \subseteq \mathbb{R}^3; (\theta_{az}; \theta_{el}) = f(x, y, z)\}$. Dimensions x, y, and z may define a three-dimensional space in a local or global coordinate system, $\theta_{az}$ may be an azimuth angle of blocked beams, and $\theta_{el}$ may be an elevation angle of blocked beams. $\mathcal{L}_A$ may be the 3D region corresponding to the blocked subspace, and $\mathbb{R}^3$ maybe the entire 3D space, where $\mathbb{R}$ is the set of real numbers. In other words, the beam arrival angles that are blocked may or may not vary with the location (x, y, z). The function f(x, y, z) may specify which angles of the beam arrival are blocked for each point (x, y, z).

As indicated above, FIG. 8 is provided as an example. Other examples may differ from what is described with regard to FIG. 8.

Figure 9:
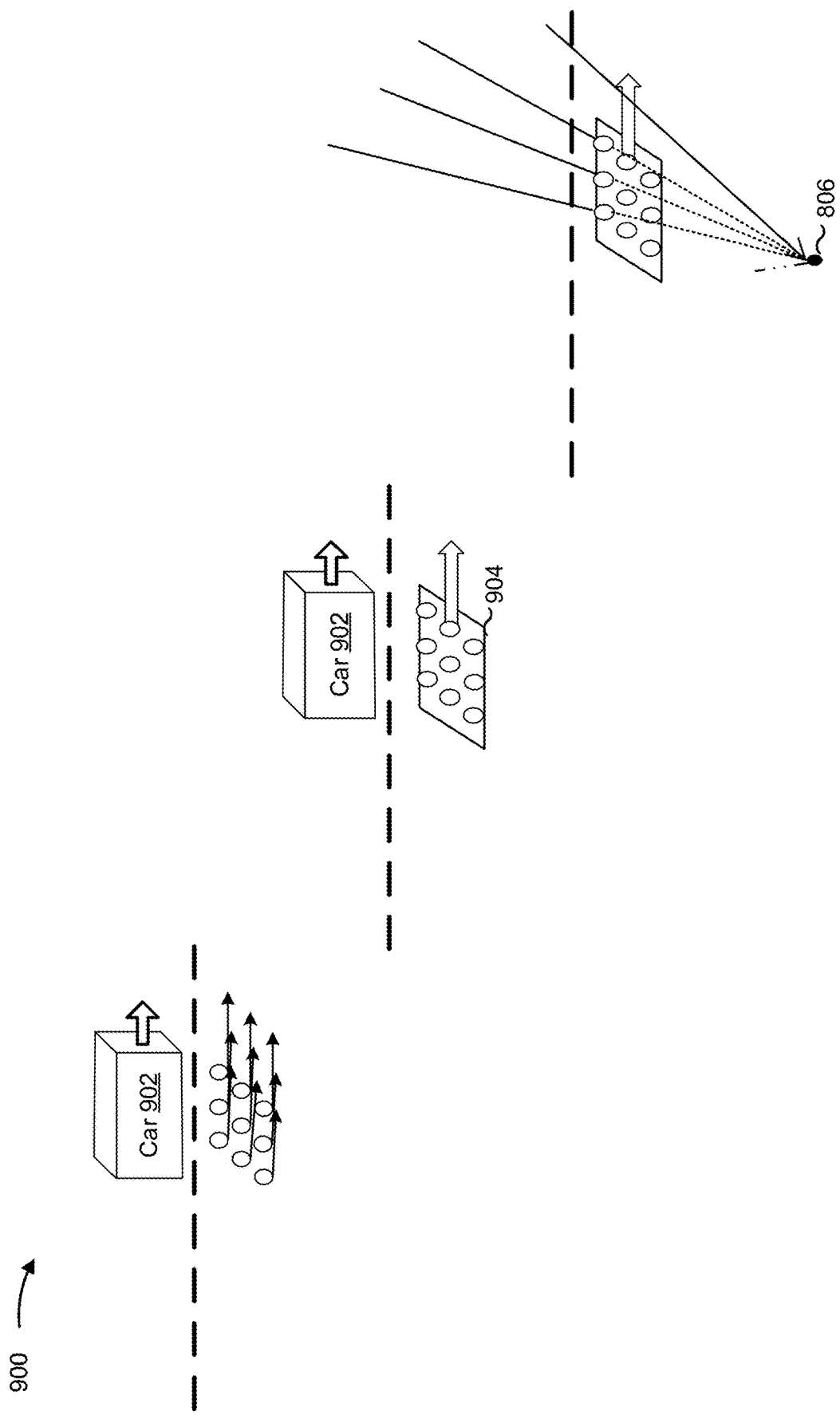
FIG. 9 is a diagram illustrating an example of predicting beam blockage, in accordance with the present disclosure.

FIG. 9 is a diagram illustrating an example 900 of predicting beam blockage, in accordance with the present disclosure.

One or more other vehicles in the vicinity of a blocking object may sense and transmit (e.g., in a BSM message) locations and velocities of different portions of the blocking object. For example, example 900 shows a vehicle UE in a car 902 in a neighboring lane of the blocking object. The vehicle UE may detect multiple points in a same location traveling at a same velocity. The vehicle UE may determine that these points are a moving surface 904 of a blocking object. The vehicle UE may determine that the blocking object satisfies a blocking object threshold and may transmit information about moving surface 904 to another vehicle UE. This information may be transmitted in response to a request for such information. Moving surface 904 may be a different surface of the same object with surface 804 identified by car 802 in FIG. 8. In some aspects, identified surfaces or other information about blocking objects in a target area may be broadcast to any UE in the area or unicast to specific UEs.

As indicated above, FIG. 9 is provided as an example. Other examples may differ from what is described with regard to FIG. 9.

Figure 10:
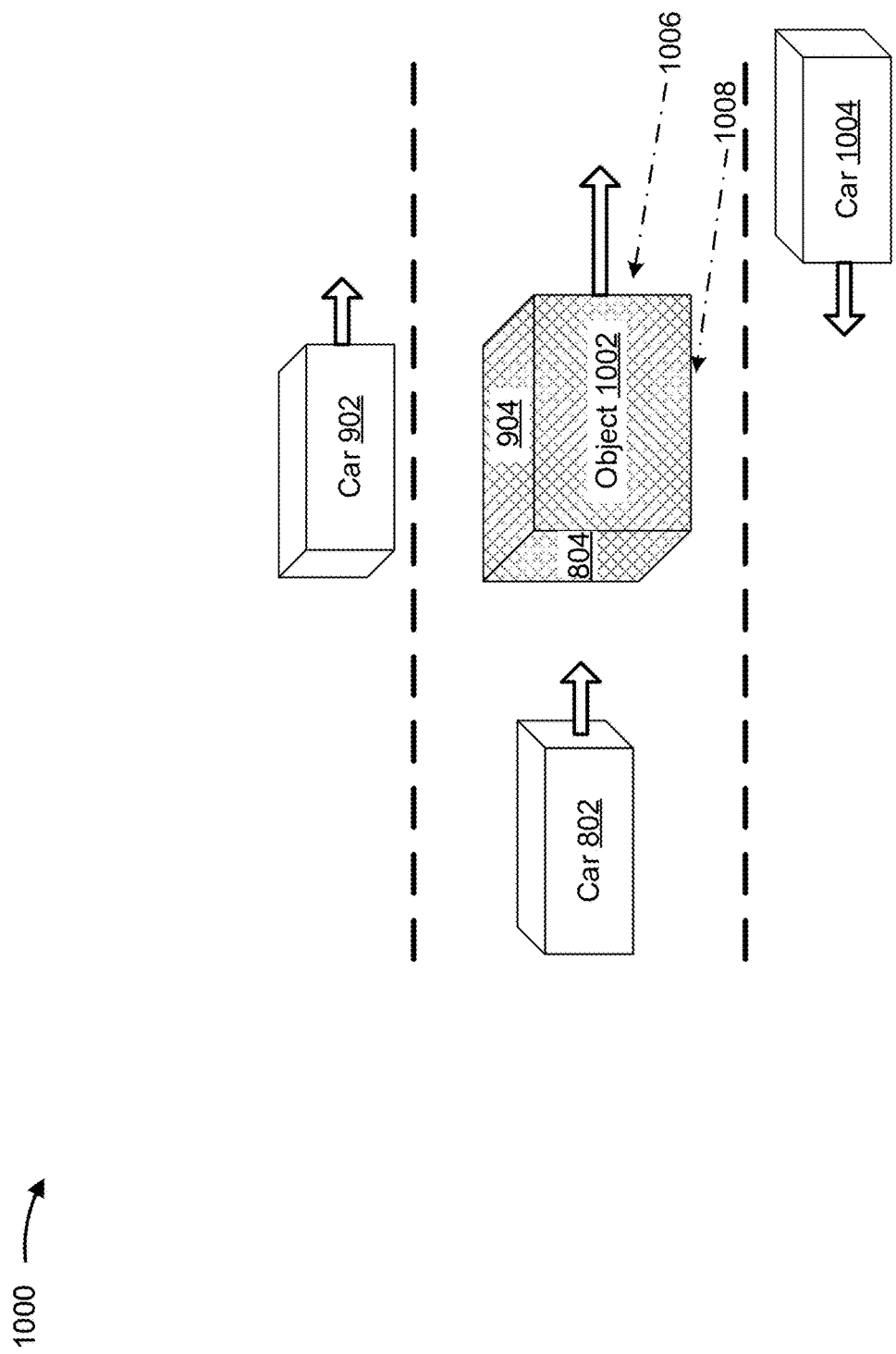
FIG. 10 is a diagram illustrating an example of identifying an object from surface information, in accordance with the present disclosure.

FIG. 10 is a diagram illustrating an example 1000 of identifying an object from surface information, in accordance with the present disclosure.

In some aspects, a vehicle UE may obtain surface information about surface 804 and surface 904 and determine that they are surfaces of a same object 1002. The vehicle UE may use machine learning to create a complete profile of object 1002 from the surface information received from vehicle UEs of multiple cars, such as from car 802, car 902, and a car 1004 that provides information about surface 1006 and surface 1008 of object 1002.

In other words, a wireless communication device (e.g., UE-X), such as a vehicle UE, may use a distributed sensing system of multiple vehicle UEs to detect a neighboring vehicle. The wireless communication device may use historical information, machine learning, and/or one or more thresholds to determine if object 1002 is a potential blocking object. The interior of object 1002 may be bounded by surfaces that are defined as a combination of surfaces parallel to surfaces 804, 904, 1006, and 1008. The blocked subspaces of any interior surfaces may be derived as a function of any blocked subspaces of surfaces 804, 904, 1006, and/or 1008. That is, the bounding box of the 3D object under observation may be defined by surfaces 804, 904, 1006, and 1008. And as such, the subspaces that will be blocked by any set of points lying in the interior of the 3D object may be deduced from information associated with the knowledge of the subspaces that are blocked by surfaces 804, 904, 1006, and/or 1008.

As indicated above, FIG. 10 is provided as an example. Other examples may differ from what is described with regard to FIG. 10.

Figure 11:
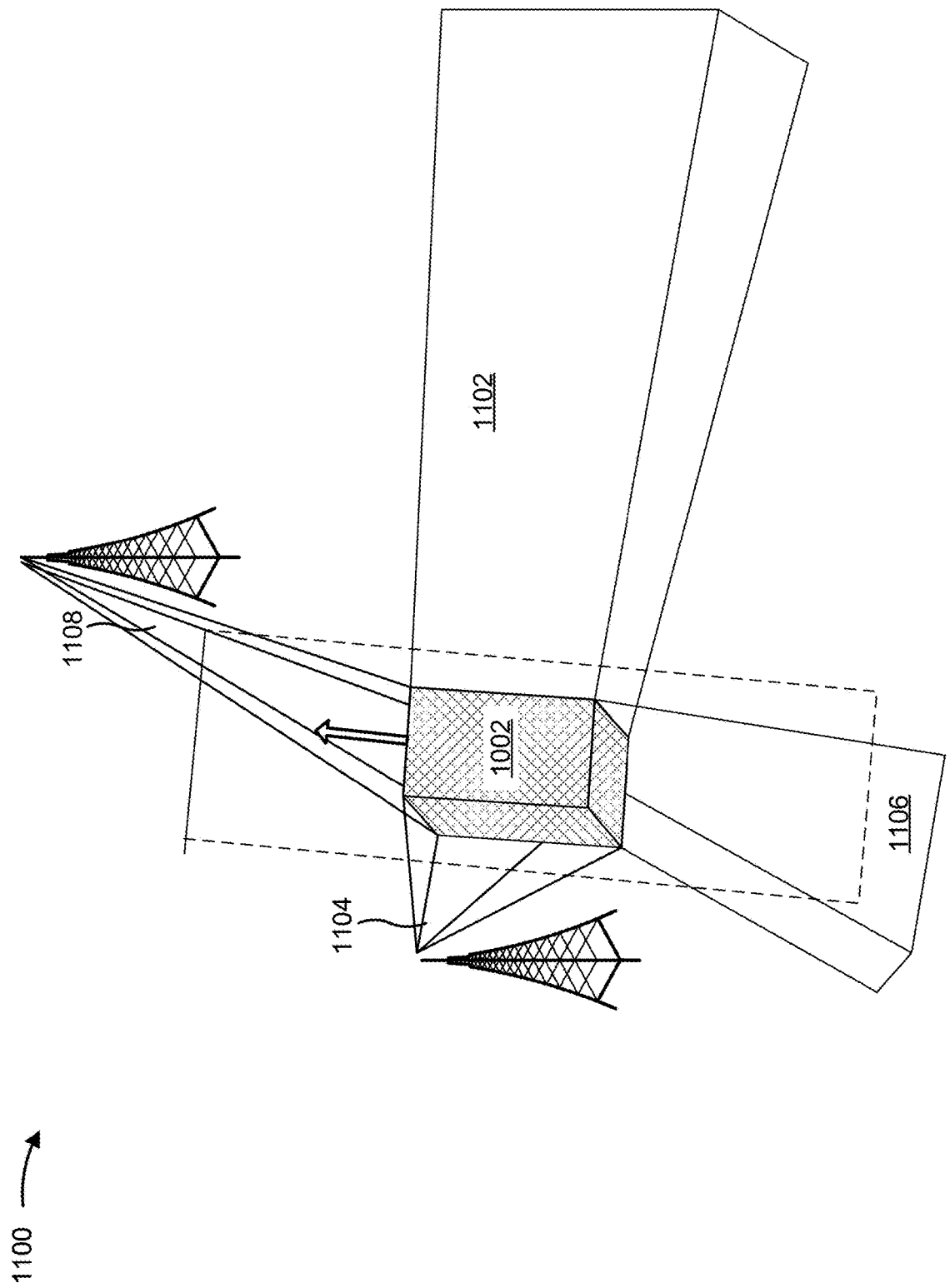
FIG. 11 is a diagram illustrating an example of tracking an object, in accordance with the present disclosure.

FIG. 11 is a diagram illustrating an example 1100 of tracking an object, in accordance with the present disclosure.

Object 1002 may be a complete representation of a detected neighboring vehicle, and object 1002 may be tracked as a single object. That is, tracking the location, velocity, and orientation of one fixed point on object 1002 may be sufficient for tracking object 1002 in the future. A gNB may trigger a vehicle UE to identify and track a blocking object.

Similarly, blocked subspaces corresponding to object 1002 may also be tracked with less overhead. For example, blocked subspace 1102 from signal 1104 and blocked subspace 1106 from signal 1108 may be tracked with object 1002 or separately from object 1002.

In some aspects, a vehicle UE may predict a near-future location of object 1002 or a blocked subspace using velocity information from vehicle sensors. For example, the vehicle UE may predict a new location of object 1002 as a function of velocity and time.

As indicated above, FIG. 11 is provided as an example. Other examples may differ from what is described with regard to FIG. 11.

Figure 12:
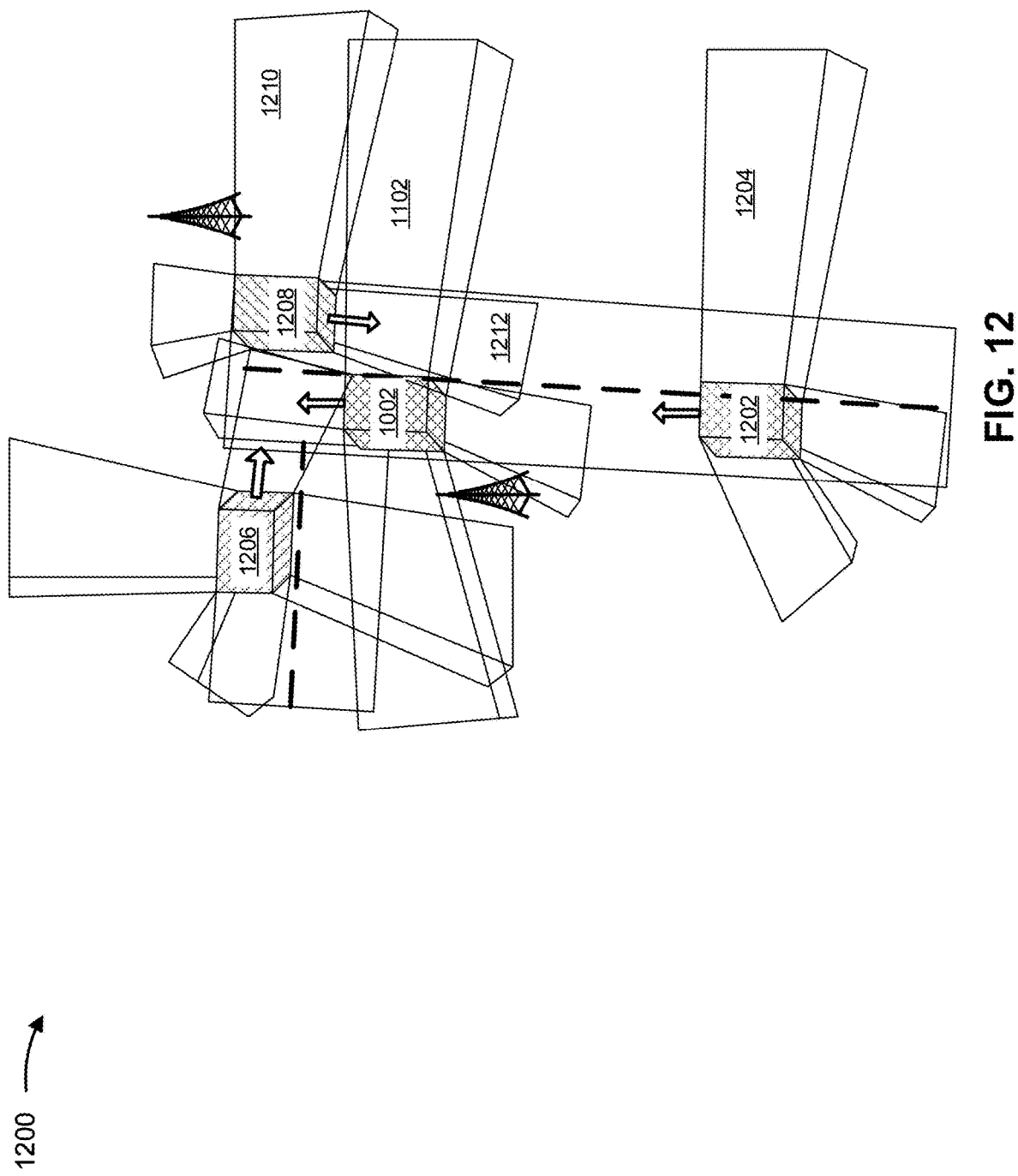
FIG. 12 is a diagram illustrating an example of interacting objects, in accordance with the present disclosure.

FIG. 12 is a diagram illustrating an example 1200 of interacting objects, in accordance with the present disclosure.

In some scenarios, multiple vehicles that share the same cell may create blocked subspaces that might coincide or interact with each other. Example 1200 shows object 1002 with a corresponding blocked subspace 1102 and object 1202 with a corresponding blocked subspace 1204. Object 1002 and object 1202 may be traveling together at a similar velocity. Meanwhile, object 1206 and object 1208 may be traveling in different directions nearby. Object 1208 may have a blocked subspace 1210 and a blocked subspace 1212 that interacts with blocked subspace 1102. The interacting blocked subspaces may, for example, overlap to some degree. This may require a substantial amount of computation by a vehicle UE or other device that is tracking the multiple objects.

In some aspects, a vehicle UE may use machine learning and proximities between multiple objects to track multiple objects (e.g., vehicles approaching an intersection as rush hour) as one object or one group. For example, object 1002 and object 1202 may be tracked as one group with subspace 1102 and subspace 1204. This may help to reduce a search space or eliminate search spaces that lead to highly constrained beam directions that may be blocked in the near future. The vehicle UE may also track clear spaces between object 1002 and object 1202. This may help to reduce computation when blocked subspace 1102 and blocked subspace 1204 begin to overlap with blocked subspace 1210 and blocked subspace 1212. The vehicle UE may group objects based at least in part on comparing proximities between the objects to a proximity threshold.

As indicated above, FIG. 12 is provided as an example. Other examples may differ from what is described with regard to FIG. 12.

Figure 13:
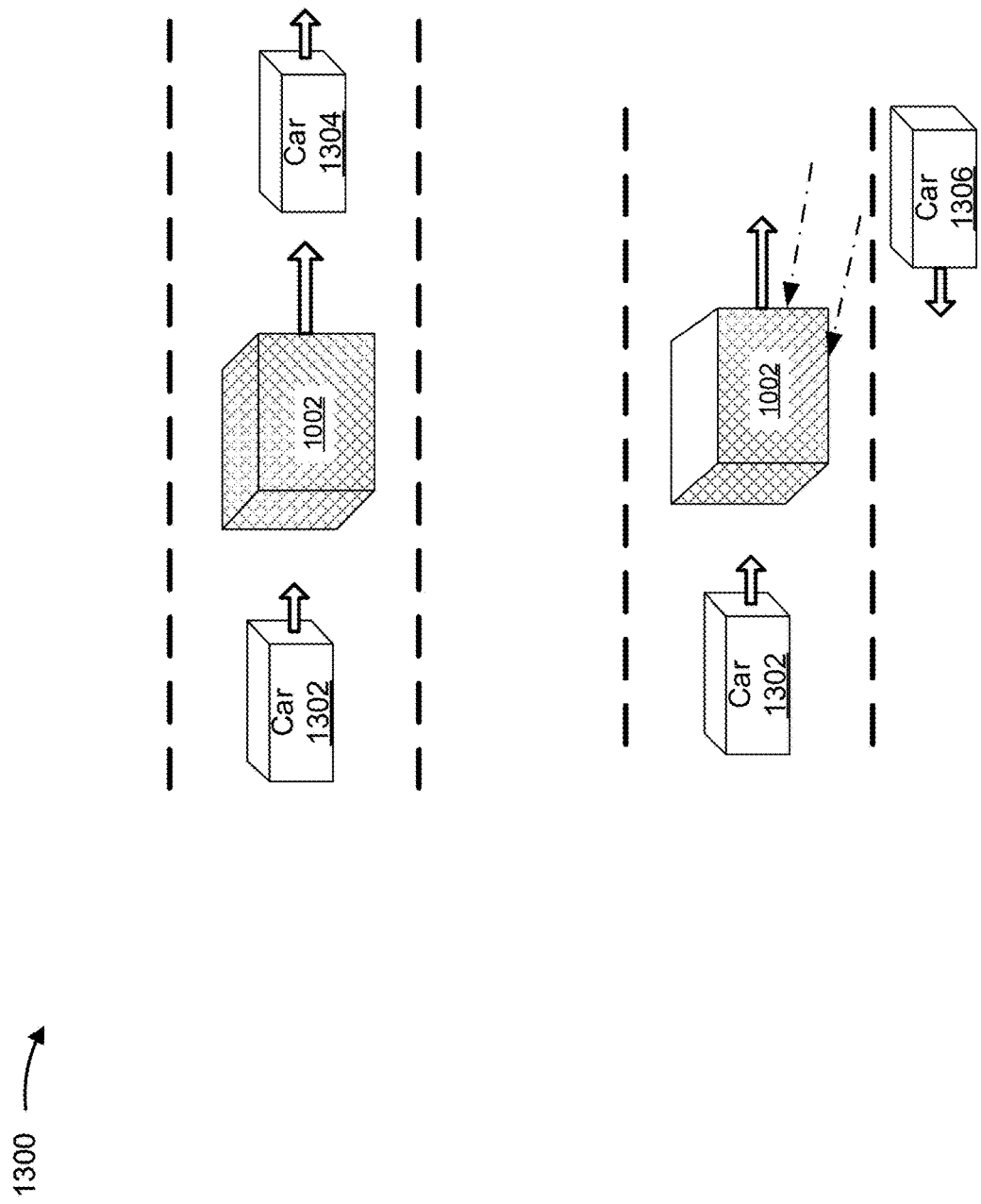
FIG. 13 is a diagram illustrating an example of blind spots, in accordance with the present disclosure.

FIG. 13 is a diagram illustrating an example 1300 of blind spots, in accordance with the present disclosure.

Example 1300 shows that object 1002 may create a blind spot for car 1302, such that car 1302 is not able to identify surfaces of object 1002 that are exposed to car 1304. Object 1002 may be considered an under-determined object in the environment. This may lead to a lower confidence level for beam blockage prediction. However, a passing car 1306 may provide information about surfaces that car 1302 is not able to observe. The information for unknown or targeted surfaces may be requested by broadcast V2X messages and received by BSM messages. The information may include an object's position, velocity, and/or dimensions.

In some aspects, if no other vehicles are in the area to provide information about unobserved dimensions, a gNB or a roadside unit may be equipped with sensors to provide dimension information to a vehicle UE, to account for any blind spot that makes predicting beam blockages difficult. By incorporating different aspects described herein for identifying and tracking blocking objects, a wireless communication device may use a distributed sensing system of multiple vehicles to better predict beam blockages for nearby UEs and to improve communications of the nearby UEs.

As indicated above, FIG. 13 is provided as an example. Other examples may differ from what is described with regard to FIG. 13.

Figure 14:
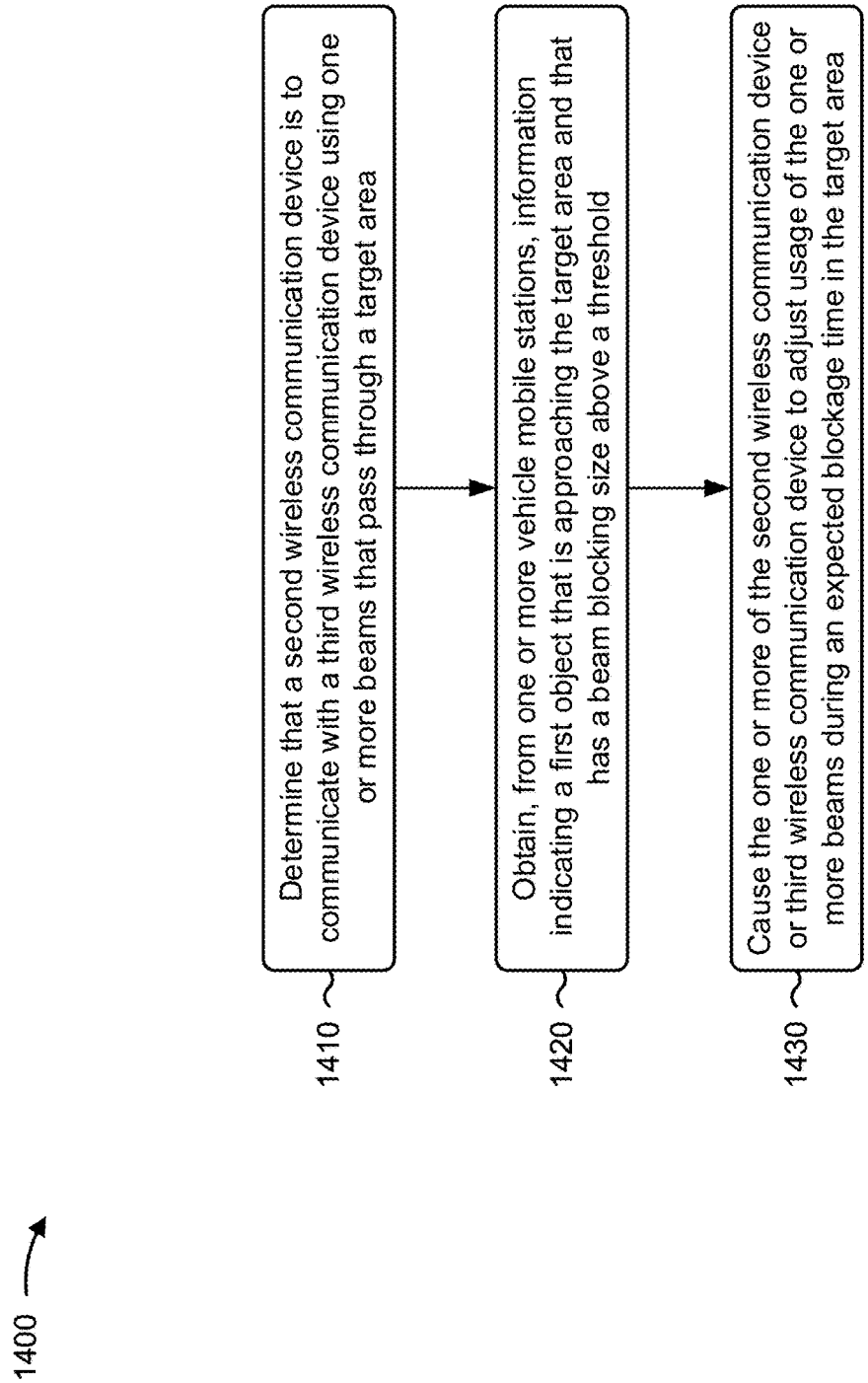
FIG. 14 is a diagram illustrating an example process performed, for example, by a first wireless communication device, in accordance with the present disclosure.

FIG. 14 is a diagram illustrating an example process 1400 performed, for example, by a first wireless communication device, in accordance with the present disclosure. Example process 1400 is an example where the first wireless communication device (e.g., a UE 120 depicted in FIGS. 1-2, UE 630, TRP 615, or BS 610 depicted in FIGS. 6A-6D) performs operations associated with beam blockage prediction for vehicle communications.

As shown in FIG. 14, in some aspects, process 1400 may include determining that a second wireless communication device is to communicate with a third wireless communication device using one or more beams that pass through a target area (block 1410). For example, the first wireless communication device (e.g., using prediction component 1608 depicted in FIG. 16) may determine that a second wireless communication device is to communicate with a third wireless communication device using one or more beams that pass through a target area, as described above.

As further shown in FIG. 14, in some aspects, process 1400 may include obtaining information indicating a first object that is approaching the target area and that has a beam blocking size above a threshold (block 1420). For example, the first wireless communication device (e.g., using adjustment component 1610 depicted in FIG. 16) may obtain information indicating a first object that is approaching the target area and that has a beam blocking size above a threshold, as described above.

As further shown in FIG. 14, in some aspects, process 1400 may include causing the one or more of the second wireless communication device or third wireless communication device to adjust usage of the one or more beams during an expected blockage time in the target area (block 1430). For example, the first wireless communication device (e.g., using adjustment component 1610 depicted in FIG. 16) may cause the one or more of the second wireless communication device or third wireless communication device to adjust usage of the one or more beams during an expected blockage time in the target area, as described above.

Process 1400 may include additional aspects, such as any single aspect or any combination of aspects described below and/or in connection with one or more other processes described elsewhere herein.

In a first aspect, the third wireless communication device is the first wireless communication device.

In a second aspect, alone or in combination with the first aspect, the second wireless communication device is a pedestrian mobile station and the third wireless communication device is a base station.

In a third aspect, alone or in combination with one or more of the first and second aspects, the first object is a vehicle and the target area is a traffic area.

In a fourth aspect, alone or in combination with one or more of the first through third aspects, causing the second wireless communication device to adjust usage of the one or more beams comprises causing the second wireless communication device to reduce or eliminate use of a beam blocked by the first object in the target area.

In a fifth aspect, alone or in combination with one or more of the first through fourth aspects, causing the second wireless communication device to adjust usage of the one or more beams comprises transmitting, by the first wireless communication device, a message indicating that a beam of the second wireless communication device is to be blocked by the first object in the target area.

In a sixth aspect, alone or in combination with one or more of the first through fifth aspects, the first wireless communication device is a vehicle mobile station, and obtaining the information indicating the first object comprises detecting a location of one or more points of a surface of the first object that move at a same velocity.

In a seventh aspect, alone or in combination with one or more of the first through sixth aspects, obtaining the information indicating the first object comprises broadcasting a vehicle-to-everything message, and receiving, from a first vehicle mobile station of the one or more vehicle mobile stations, first sensing information associated with the first object.

In an eighth aspect, alone or in combination with one or more of the first through seventh aspects, process 1400 includes receiving, by the first wireless communication device from a second vehicle mobile station of the one or more vehicle mobile stations, second sensing information associated with the first object, and determining, by the first wireless communication device, one or more dimensions of the first object based at least in part on the first sensing information and the second sensing information.

In a ninth aspect, alone or in combination with one or more of the first through eighth aspects, process 1400 includes associating, by the first wireless communication device with the first object, a representative point of one or more points of a surface of the first object, and tracking, by the first wireless communication device, the representative point to predict when the first object is to be in the target area.

In a tenth aspect, alone or in combination with one or more of the first through ninth aspects, process 1400 includes associating, by the first wireless communication device, the first object with a second object traveling to the target area, and tracking, by the first wireless communication device, the first object and the second object as a group.

In an eleventh aspect, alone or in combination with one or more of the first through tenth aspects, process 1400 includes transmitting, by the first wireless communication device to one or more vehicle mobile stations, information indicating that the first object is approaching the target area and has a beam blocking size above the threshold.

In a twelfth aspect, alone or in combination with one or more of the first through eleventh aspects, process 1400 includes transmitting, by the first wireless communication device, a request for one or more of location information or velocity information for the first object based at least in part on a lack of information for a dimension of the first object.

In a thirteenth aspect, alone or in combination with one or more of the first through twelfth aspects, the obtaining is based at least in part on receiving an indication from a base station or a roadside unit.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
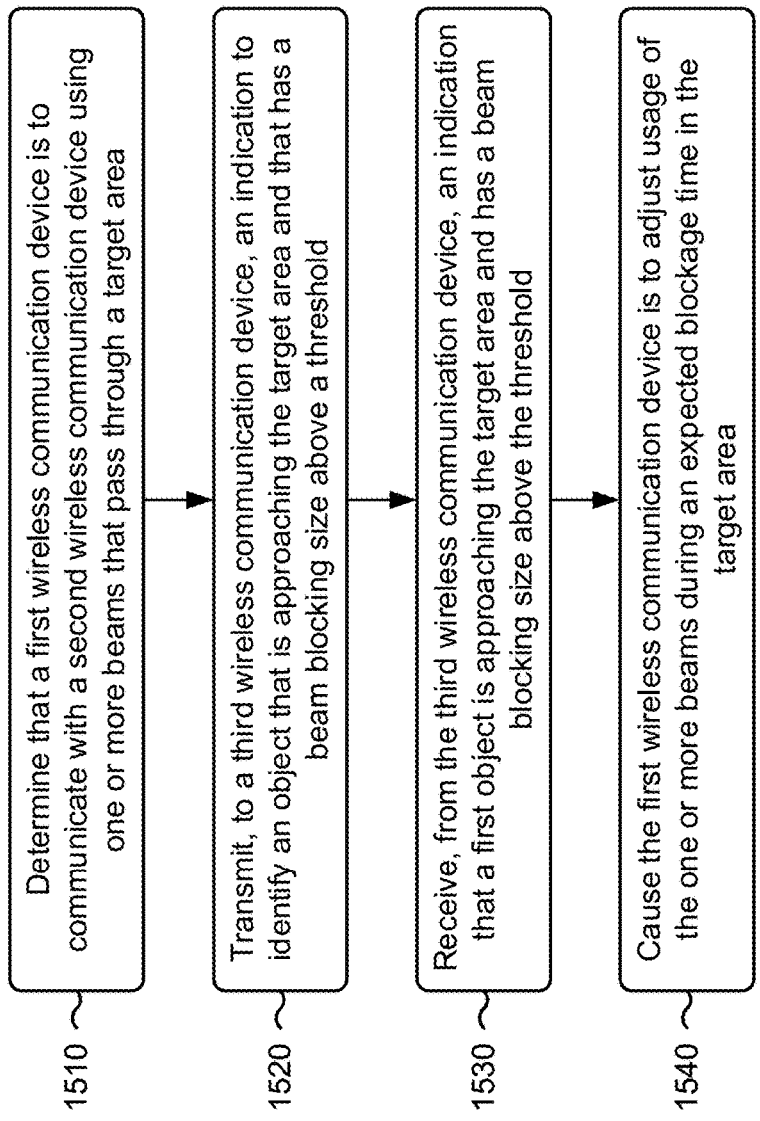
FIG. 15 is a diagram illustrating an example process performed, for example, by a base station, in accordance with the present disclosure.

FIG. 15 is a diagram illustrating an example process 1500 performed, for example, by a base station, in accordance with the present disclosure. Example process 1500 is an example where the base station (e.g., a base station 110 depicted in FIGS. 1-2, BS 610 depicted in FIGS. 6A-6D) performs operations associated with beam blockage prediction for vehicle communications.

As shown in FIG. 15, in some aspects, process 1500 may include determining that a first wireless communication device is to communicate with a second wireless communication device using one or more beams that pass through a target area (block 1510). For example, the base station (e.g., using determination component 1708 depicted in FIG. 17) may determine that a first wireless communication device is to communicate with a second wireless communication device using one or more beams that pass through a target area, as described above.

As further shown in FIG. 15, in some aspects, process 1500 may include transmitting an indication to identify an object that is approaching the target area and that has a beam blocking size above a threshold (block 1520). For example, the base station (e.g., using transmission component 1704 depicted in FIG. 17) may transmit an indication to identify an object that is approaching the target area and that has a beam blocking size above a threshold, as described above.

As further shown in FIG. 15, in some aspects, process 1500 may include receiving an indication that a first object is approaching the target area and has a beam blocking size above the threshold (block 1530). For example, the base station (e.g., using reception component 1702 depicted in FIG. 17) may receive an indication that a first object is approaching the target area and has a beam blocking size above the threshold, as described above.

As further shown in FIG. 15, in some aspects, process 1500 may include causing the first wireless communication device is to adjust usage of the one or more beams during an expected blockage time in the target area (block 1540). For example, the base station (e.g., using adjustment component 1710 depicted in FIG. 17) may cause the first wireless communication device is to adjust usage of the one or more beams during an expected blockage time in the target area, as described above.

Process 1500 may include additional aspects, such as any single aspect or any combination of aspects described below and/or in connection with one or more other processes described elsewhere herein.

In a first aspect, the third wireless communication device is a vehicle mobile station.

In a second aspect, alone or in combination with the first aspect, the first wireless communication device is a pedestrian mobile station.

In a third aspect, alone or in combination with one or more of the first and second aspects, the base station is the second wireless communication device.

In a fourth aspect, alone or in combination with one or more of the first through third aspects, the third wireless communication device is the second wireless communication device.

In a fifth aspect, alone or in combination with one or more of the first through fourth aspects, the first object is a vehicle and the target area is a traffic area.

In a sixth aspect, alone or in combination with one or more of the first through fifth aspects, causing the first wireless communication device to adjust usage of the one or more beams comprises causing the first wireless communication device to reduce or eliminate use of a beam blocked by the first object in the target area.

In a seventh aspect, alone or in combination with one or more of the first through sixth aspects, process 1500 includes receiving, by the base station, an indication of one or more dimensions of the first object.

In an eighth aspect, alone or in combination with one or more of the first through seventh aspects, process 1500 includes transmitting, by the base station to one or more vehicle mobile stations, information indicating that the first object is approaching the target area and has a beam blocking size above a threshold.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
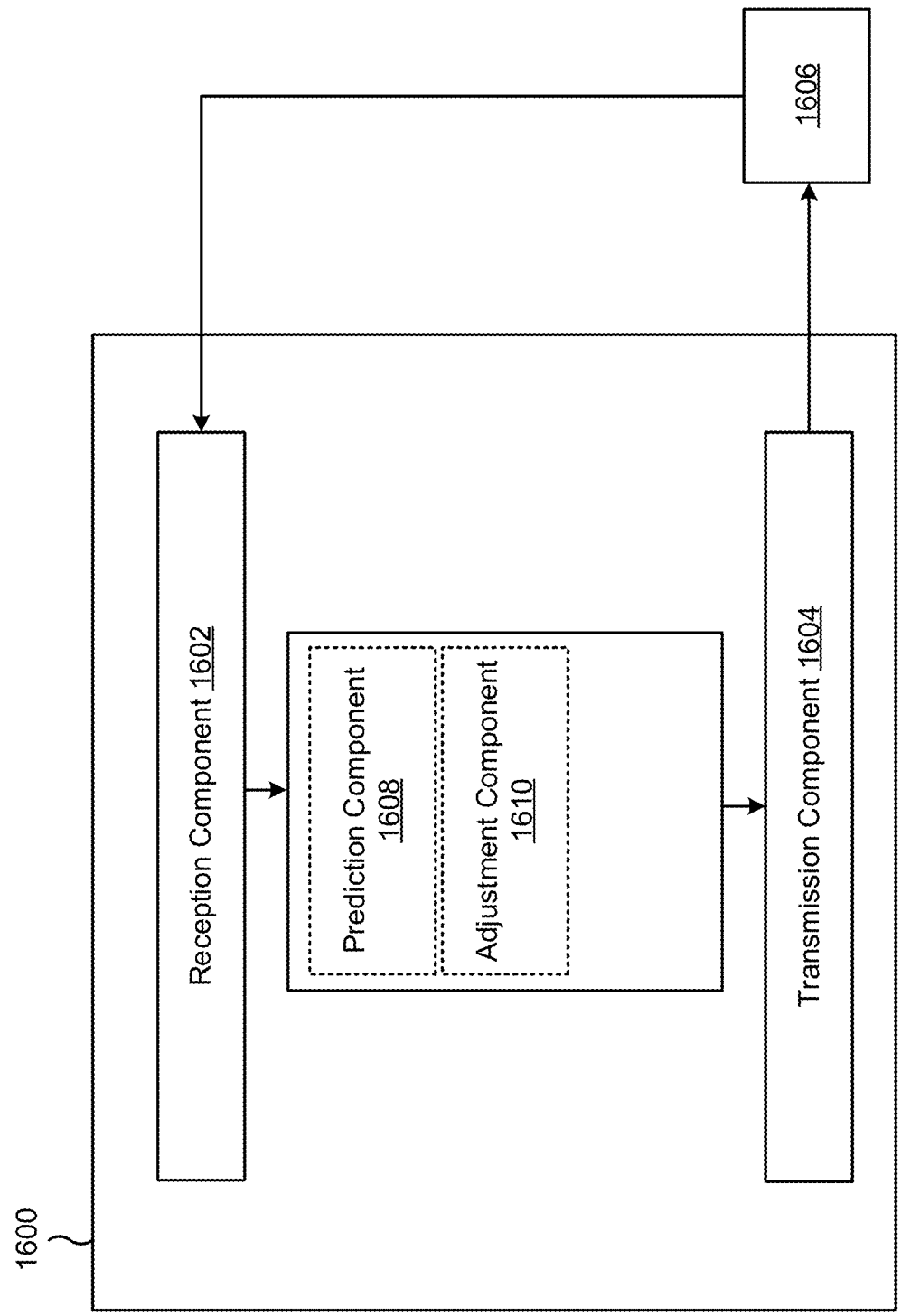
FIGS. 16-17 are block diagrams of example apparatuses for wireless communication, in accordance with the present disclosure.

FIG. 16 is a block diagram of an example apparatus 1600 for wireless communication. The apparatus 1600 may be a first wireless communication device, or a first wireless communication device may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a prediction component 1608 and/or an adjustment component 1610, among other examples.

In some aspects, the apparatus 1600 may be configured to perform one or more operations described herein in connection with FIGS. 1-13. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The prediction component 1608 may determine that a second wireless communication device is to communicate with a third wireless communication device using one or more beams that pass through a target area. The prediction component 1608 may obtain information indicating a first object that is approaching the target area and that has a beam blocking size above a threshold. The adjustment component 1610 may cause the one or more of the second wireless communication device or third wireless communication device to adjust usage of the one or more beams during an expected blockage time in the target area. The reception component 1602 may receive second sensing information associated with the first object.

The prediction component 1608 may determine one or more dimensions of the first object based at least in part on the first sensing information and the second sensing information. The prediction component 1608 may associate a representative point of one or more points of a surface of the first object. The prediction component 1608 may track the representative point to predict when the first object is to be in the target area.

The prediction component 1608 may associate the first object with a second object traveling to the target area. The prediction component 1608 may track the first object and the second object as a group.

The transmission component 1604 may transmit information indicating that the first object is approaching the target area and has a beam blocking size above the threshold. The transmission component 1604 may transmit a request for one or more of location information or velocity information for the first object based at least in part on a lack of information for a dimension of the first object.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
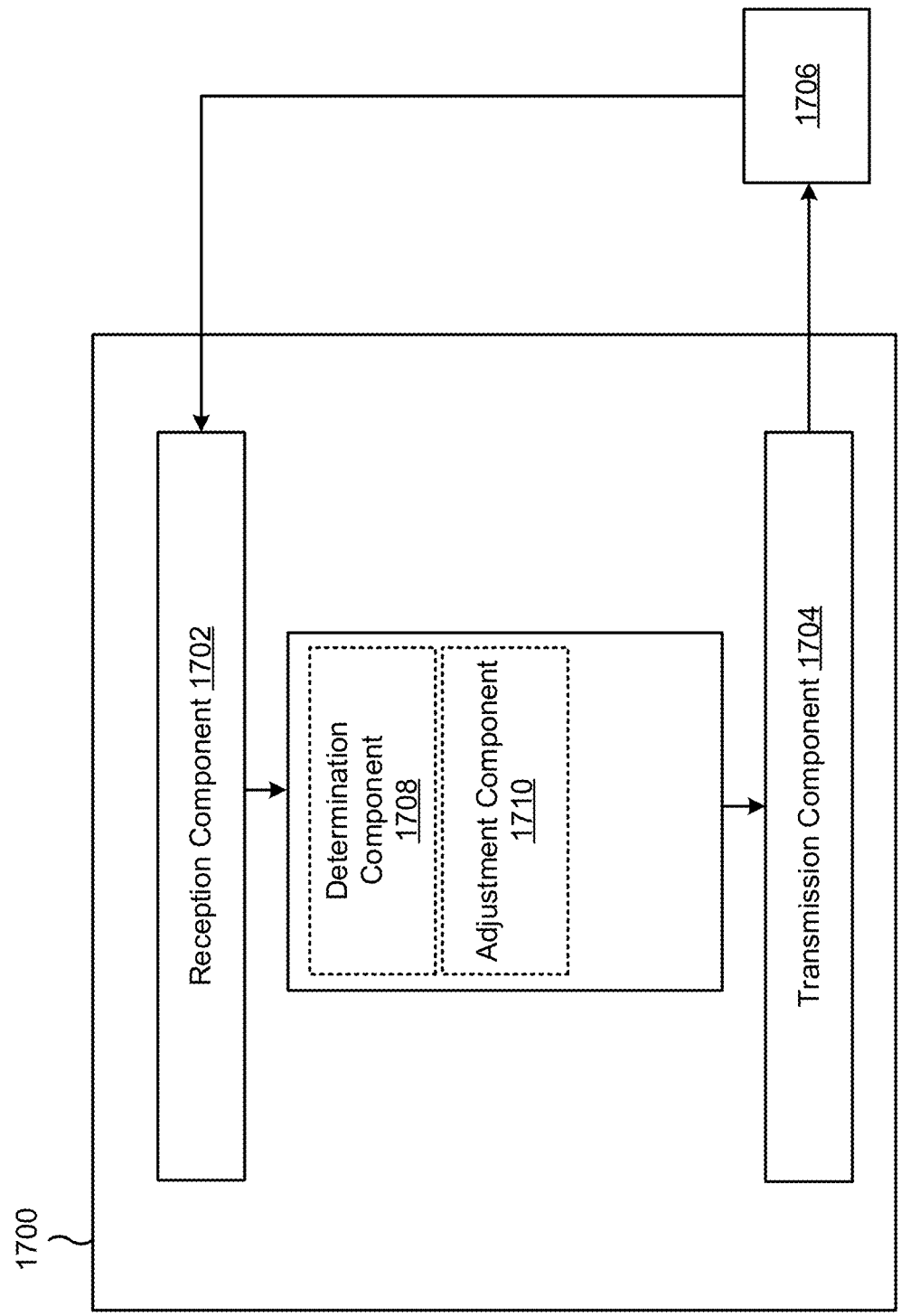

FIG. 17 is a block diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a determination component 1708 and/or an adjustment component 1710, among other examples.

In some aspects, the apparatus 1700 may be configured to perform one or more operations described herein in connection with FIGS. 1-13. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the wireless communication device described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the wireless communication device described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the wireless communication device described above in connection with FIG. 2. In some aspects, the transmission component 1704 may be co-located with the reception component 1702 in a transceiver.

The determination component 1708 may determine that a first wireless communication device is to communicate with a second wireless communication device using one or more beams that pass through a target area. The transmission component 1704 may transmit an indication to identify an object that is approaching the target area and that has a beam blocking size above a threshold. The reception component 1702 may receive an indication that a first object is approaching the target area and has a beam blocking size above the threshold. The adjustment component 1710 may cause the first wireless communication device is to adjust usage of the one or more beams during an expected blockage time in the target area. The reception component 1702 may receive an indication of one or more dimensions of the first object. The transmission component 1704 may transmit information indicating that the first object is approaching the target area and has a beam blocking size above a threshold.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

The following provides an overview of some Aspects of the present disclosure:

Aspect 1: A method of wireless communication performed by a first wireless communication device, comprising: determining, by the first wireless communication device, that a second wireless communication device is to communicate with a third wireless communication device using one or more beams that pass through a target area; obtaining, by the first wireless communication device from one or more vehicle mobile stations, information indicating a first object that is approaching the target area and that has a beam blocking size above a threshold; and causing, by the first wireless communication device, the one or more of the second wireless communication device or third wireless communication device to adjust usage of the one or more beams during an expected blockage time in the target area.

Aspect 2: The method of Aspect 1, wherein the third wireless communication device is the first wireless communication device.

Aspect 3: The method of Aspect 1, wherein the second wireless communication device is a pedestrian mobile station and the third wireless communication device is a base station.

Aspect 4: The method of any of Aspects 1-3, wherein the first object is a vehicle and the target area is a traffic area.

Aspect 5: The method of any of Aspects 1-4, wherein causing the second wireless communication device to adjust usage of the one or more beams comprises causing the second wireless communication device to reduce or eliminate use of a beam blocked by the first object in the target area.

Aspect 6: The method of any of Aspects 1-5, wherein causing the second wireless communication device to adjust usage of the one or more beams comprises transmitting, by the first wireless communication device, a message indicating that a beam of the second wireless communication device is to be blocked by the first object in the target area.

Aspect 7: The method of any of Aspects 1-6, wherein the first wireless communication device is a vehicle mobile station, and wherein obtaining the information indicating the first object comprises detecting a location of one or more points of a surface of the first object that move at a same velocity.

Aspect 8: The method of any of Aspects 1-7, wherein obtaining the information indicating the first object comprises: broadcasting a vehicle-to-everything message; and receiving, from a first vehicle mobile station of the one or more vehicle mobile stations, first sensing information associated with the first object.

Aspect 9: The method of Aspect 8, further comprising: receiving, by the first wireless communication device from a second vehicle mobile station of the one or more vehicle mobile stations, second sensing information associated with the first object; and determining, by the first wireless communication device, one or more dimensions of the first object based at least in part on the first sensing information and the second sensing information.

Aspect 10: The method of any of Aspects 1-9, further comprising: associating, by the first wireless communication device with the first object, a representative point of one or more points of a surface of the first object; and tracking, by the first wireless communication device, the representative point to predict when the first object is to be in the target area.

Aspect 11: The method of any of Aspects 1-10, further comprising: associating, by the first wireless communication device, the first object with a second object traveling to the target area; and tracking, by the first wireless communication device, the first object and the second object as a group.

Aspect 12: The method of any of Aspects 1-11, further comprising transmitting, by the first wireless communication device to one or more vehicle mobile stations, information indicating that the first object is approaching the target area and has a beam blocking size above the threshold.

Aspect 13: The method of any of Aspects 1-12, further comprising transmitting, by the first wireless communication device, a request for one or more of location information or velocity information for the first object based at least in part on a lack of information for a dimension of the first object.

Aspect 14: The method of any of Aspects 1-13, wherein the obtaining is based at least in part on receiving an indication from a base station or a roadside unit.

Aspect 15: A method of wireless communication performed by a base station, comprising: determining, by the base station, that a first wireless communication device is to communicate with a second wireless communication device using one or more beams that pass through a target area; transmitting, by the base station to a third wireless communication device, an indication to identify an object that is approaching the target area and that has a beam blocking size above a threshold; receiving, by the base station from the third wireless communication device, an indication that a first object is approaching the target area and has a beam blocking size above the threshold; and causing, by the base station, the first wireless communication device is to adjust usage of the one or more beams during an expected blockage time in the target area.

Aspect 16: The method of Aspect 15, wherein the third wireless communication device is a vehicle mobile station.

Aspect 17: The method of Aspect 15 or 16, wherein the first wireless communication device is a pedestrian mobile station.

Aspect 18: The method of Aspect 15 or 16, wherein the base station is the second wireless communication device.

Aspect 19: The method of Aspect 15 or 16, wherein the third wireless communication device is the second wireless communication device.

Aspect 20: The method of any of Aspects 15-19, wherein the first object is a vehicle and the target area is a traffic area.

Aspect 21: The method of any of Aspects 15-20, wherein causing the first wireless communication device to adjust usage of the one or more beams comprises causing the first wireless communication device to reduce or eliminate use of a beam blocked by the first object in the target area.

Aspect 22: The method of any of Aspects 15-21, further comprising receiving, by the base station, an indication of one or more dimensions of the first object.

Aspect 23: The method of any of Aspects 15-22, further comprising transmitting, by the base station to one or more vehicle mobile stations, information indicating that the first object is approaching the target area and has a beam blocking size above a threshold.

Aspect 24: An apparatus for wireless communication at a device, comprising a processor; memory coupled with the processor; and instructions stored in the memory and executable by the processor to cause the apparatus to perform the method of one or more Aspects of Aspects 1-23.

Aspect 25: A device for wireless communication, comprising a memory and one or more processors coupled to the memory, the memory and the one or more processors configured to perform the method of one or more Aspects of Aspects 1-23.

Aspect 26: An apparatus for wireless communication, comprising at least one means for performing the method of one or more Aspects of Aspects 1-23.

Aspect 27: A non-transitory computer-readable medium storing code for wireless communication, the code comprising instructions executable by a processor to perform the method of one or more Aspects of Aspects 1-23.

Aspect 28: A non-transitory computer-readable medium storing a set of instructions for wireless communication, the set of instructions comprising one or more instructions that, when executed by one or more processors of a device, cause the device to perform the method of one or more Aspects of Aspects 1-23.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device for wireless communication, comprising:
    a memory; and
    one or more processors that, based at least in part on information stored in the memory, are configured to:
        determine that a second wireless communication device is to communicate with a third wireless communication device using one or more beams that pass through a target area;
        obtain information indicating a first object that is approaching the target area and that has a beam blocking size above a threshold; and
        cause at least one of the second wireless communication device or the third wireless communication device to switch the one or more beams during an expected blockage time when the first object is predicted to be in the target area.

2. The first wireless communication device of claim 1, wherein the third wireless communication device is the first wireless communication device.

3. The first wireless communication device of claim 1, wherein the second wireless communication device is a pedestrian mobile station and the third wireless communication device is a network entity.

4. The first wireless communication device of claim 1, wherein the first object is a vehicle and the target area is a traffic area.

5. The first wireless communication device of claim 1, wherein the one or more processors, when causing the second wireless communication device to switch the one or more beams, are configured to cause the second wireless communication device to adjust use of a beam to be blocked by the first object.

6. The first wireless communication device of claim 1, wherein the one or more processors, when causing the second wireless communication device to switch the one or more beams, are configured to transmit, by the first wireless communication device, a message indicating that a beam of the second wireless communication device is to be blocked by the first object.

7. The first wireless communication device of claim 1, wherein the first wireless communication device is a vehicle mobile station, and wherein the one or more processors are configured to obtain the information indicating the first object by detecting a location of one or more points of a surface of the first object that move at a same velocity.

8. The first wireless communication device of claim 1, wherein the one or more processors, when obtaining the information indicating the first object, are configured to:
broadcast a vehicle-to-everything message; and
receive, from a first vehicle mobile station, first sensing information associated with the first object.

9. The first wireless communication device of claim 8, wherein the one or more processors are further configured to:
receive second sensing information associated with the first object; and
determine one or more dimensions of the first object based at least in part on the first sensing information and the second sensing information.

10. The first wireless communication device of claim 1, wherein the one or more processors are further configured to:
associate a representative point of one or more points of a surface of the first object; and
track the representative point to predict when the first object is to be in the target area.

11. The first wireless communication device of claim 1, wherein the one or more processors are further configured to:
associate the first object with a second object traveling to the target area; and
track the first object and the second object as a group.

12. The first wireless communication device of claim 1, wherein the one or more processors are further configured to transmit information indicating that the first object is approaching the target area and has a beam blocking size above the threshold.

13. The first wireless communication device of claim 1, wherein the one or more processors are further configured to transmit a request for one or more of location information or velocity information for the first object based at least in part on a lack of information for a dimension of the first object.

14. The first wireless communication device of claim 1, wherein the obtaining is based at least in part on receiving an indication from a network entity.

15. The first wireless communication device of claim 1, wherein the third wireless communication device is a vehicle mobile station.

16. A network entity for wireless communication, comprising:
a memory; and
one or more processors that, based at least in part on information stored in the memory, are configured to:
determine that a first wireless communication device is to communicate with a second wireless communication device using one or more beams that pass through a target area;
transmit an indication to identify an object that is approaching the target area and that has a beam blocking size above a threshold;
receive an indication that a first object is approaching the target area and has a beam blocking size above the threshold; and
cause the first wireless communication device to switch the one or more beams during an expected blockage time when the first object is predicted to be in the target area.

17. The network entity of claim 16, wherein the first wireless communication device is a pedestrian mobile station.

18. The network entity of claim 16, wherein the network entity is the second wireless communication device.

19. The network entity of claim 16, wherein the first object is a vehicle and the target area is a traffic area.

20. The network entity of claim 16, wherein the one or more processors, when causing the first wireless communication device to switch the one or more beams, are configured to cause the first wireless communication device to adjust use of a beam to be blocked by the first object in the target area.

21. The network entity of claim 16, wherein the one or more processors are further configured to receive an indication of one or more dimensions of the first object.

22. The network entity of claim 16, wherein the memory and the one or more processors are further configured to transmit information indicating that the first object is approaching the target area and has a beam blocking size above a threshold.

23. A method of wireless communication performed by a first wireless communication device, comprising:
determining, by the first wireless communication device, that a second wireless communication device is to communicate with a third wireless communication device using one or more beams that pass through a target area;
obtaining, by the first wireless communication device from one or more vehicle mobile stations, information indicating a first object that is approaching the target area and that has a beam blocking size above a threshold; and
causing, by the first wireless communication device, at least one of the second wireless communication device or third wireless communication device to switch the one or more beams during an expected blockage time when the first object is predicted to be in the target area.

24. The method of claim 23, wherein the first wireless communication device is a vehicle mobile station, and wherein obtaining the information indicating the first object comprises detecting a location of one or more points of a surface of the first object that move at a same velocity.

25. The method of claim 23, wherein obtaining the information indicating the first object comprises:
broadcasting a vehicle-to-everything message; and
receiving, from a first vehicle mobile station of the one or more vehicle mobile stations, first sensing information associated with the first object.

26. The method of claim 25, further comprising:
receiving, by the first wireless communication device from a second vehicle mobile station of the one or more vehicle mobile stations, second sensing information associated with the first object; and
determining, by the first wireless communication device, one or more dimensions of the first object based at least in part on the first sensing information and the second sensing information.

27. A method of wireless communication performed by network entity, comprising:
determining, by the network entity, that a first wireless communication device is to communicate with a second wireless communication device using one or more beams that pass through a target area;
transmitting, by the network entity to a third wireless communication device, an indication to identify an object that is approaching the target area and that has a beam blocking size above a threshold;

receiving, by the network entity from the third wireless communication device, an indication that a first object is approaching the target area and has a beam blocking size above the threshold; and causing, by the network entity, the first wireless communication device to switch the one or more beams during an expected blockage time when the first object is predicted to be in the target area.

28. The method of claim 27, wherein the first object is a vehicle and the target area is a traffic area.

29. The method of claim 27, wherein causing the first wireless communication device to switch the one or more beams comprises causing the first wireless communication device to adjust use of a beam to be blocked by the first object.

30. The first wireless communication device of claim 1, wherein the information comprises an angle of arrival of the beam to be blocked by the first object, and wherein causing the first wireless communication device to switch the one or more beams is based at least in part on the angle of arrival.

* * * * *